United States Patent
Shimizu et al.

(10) Patent No.: US 6,611,356 B1
(45) Date of Patent: Aug. 26, 2003

(54) COLOR DATA CONVERSION METHOD, COLOR DATA CONVERSION APPARATUS, STORAGE MEDIUM, DEVICE DRIVER AND COLOR CONVERSION TABLE

(75) Inventors: Masayoshi Shimizu, Kanagawa (JP); Masahiro Mori, Kanagawa (JP); Shoji Suzuki, Kanagawa (JP); Satoshi Semba, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/336,766

(22) Filed: Jun. 21, 1999

(30) Foreign Application Priority Data

Oct. 26, 1998 (JP) ........................... 10-304418

(51) Int. Cl.$^7$ ............................... G06F 15/00
(52) U.S. Cl. .................. 358/1.9; 358/500; 358/518; 358/525; 382/162; 382/167
(58) Field of Search .................. 358/1.9, 500, 509, 358/518, 520, 525; 382/166, 167, 162; 345/590, 589, 591, 604

(56) References Cited

U.S. PATENT DOCUMENTS

| | | | | |
|---|---|---|---|---|
| 5,450,216 A | * | 9/1995 | Kasson | 358/518 |
| 5,583,666 A | * | 12/1996 | Ellson et al. | 358/518 |
| 5,606,432 A | * | 2/1997 | Ohtsuka et al. | 358/527 |
| 5,699,491 A | * | 12/1997 | Barzel | 395/109 |
| 5,712,925 A | * | 1/1998 | Ohga | 382/167 |
| 5,724,442 A | * | 3/1998 | Ogatsu et al. | 382/167 |
| 5,724,443 A | * | 3/1998 | Nishikawa | 382/167 |
| 5,731,818 A | * | 3/1998 | Wan et al. | 345/590 |
| 5,801,855 A | * | 9/1998 | Ohta | 358/518 |
| 5,875,260 A | * | 2/1999 | Ohta | 382/162 |
| 5,933,253 A | * | 8/1999 | Ito et al. | 358/500 |
| 6,104,829 A | * | 8/2000 | Nakajima | 382/167 |
| 6,130,675 A | * | 10/2000 | Murai et al. | 345/600 |
| 6,198,843 B1 | * | 3/2001 | Nakauchi et al. | 382/167 |
| 6,310,696 B1 | * | 10/2001 | Kumada | 358/1.9 |
| 6,323,969 B1 | * | 11/2001 | Shimizu et al. | 358/523 |

FOREIGN PATENT DOCUMENTS

| | | | |
|---|---|---|---|
| EP | 0 961 488 A3 | 12/1999 | |
| EP | 0961488 | * 12/1999 | ............ H04N/1/60 |

OTHER PUBLICATIONS

U.S. patent application Ser. No. 09/022,484, Shimizu et al., filed Feb. 12, 1998.

U.S. patent application Ser. No. 09/046,674, Shimizu et al., filed Mar. 24, 1998.

Jan Morovic, "To Develop a Universal Gamut Mapping Algorithm" (Literature Survey), *Design Research Center, University of Derby*, pp. 1–33, May 14, 1997.

(List continued on next page.)

*Primary Examiner*—Edward Coles
*Assistant Examiner*—Tia Carter
(74) *Attorney, Agent, or Firm*—Staas & Halsey LLP

(57) ABSTRACT

When an L*a*b* value of a certain color is outside a target color gamut to be converted, it is judged whether the L*a*b* value is located within the range of the color gamut set under a predetermined condition. This set range is a range in which the accuracy is degraded if colors are converted using only a first method, for example, a range in the neighborhood of the color gamut. If a color to be converted is located within the range, colors are converted using a second method. If the L*a*b* value of the color to be converted is outside of the set range, it is converted using the first method until the conversion result is contained within the range. Then, the occurrence of both a problem which the first conversion method has for colors in the neighborhood of the color gamut when colors are converted and a problem which the second method has in the conversion of a color far from the color gamut can be suppressed.

25 Claims, 19 Drawing Sheets

OTHER PUBLICATIONS

Jan Morovic, "To Develop a Universal Gamut Mapping Algorithm" (literature Survey), Design Research Center, University of Derby, pp. 1–33, May 14, 1997.*

R.S. Gentile et al. , A Comparison of Techniques for Color Gamut Mismatch Compression, Oct. 16, 1990, pp. 176–181, Journal of Imaging technology, Soc. for Imaging Science and Technology, Springfield, VA, US vol. 16, No. 5*.*

Jan Morovic et al., A Universal Algorithm for Colour Gamut Mapping, Mar. 27, 1998, Colour Imaging in Multimedia Conference, derby UK.*

European Patent Office, European search report, May 31, 2002, pp. 1–3.*

R. S. Gentile et al., A Comparison of Techniques for Color Gamut Mismatch Compensation, Oct. 16, 1990, pp. 176–181, Journal of Imaging Technology, Soc. for Imaging Science and Technology, Springfield, VA, US vol. 16, No. 5.

Ján Morovic et al., A Universal Algorithm for Colour Gamut Mapping, Mar. 27, 1998, Colour Imaging in Multimedia Conference, Derby UK.

European Patent Office, European Search Report, May 31, 2002, pp. 1–3.

* cited by examiner

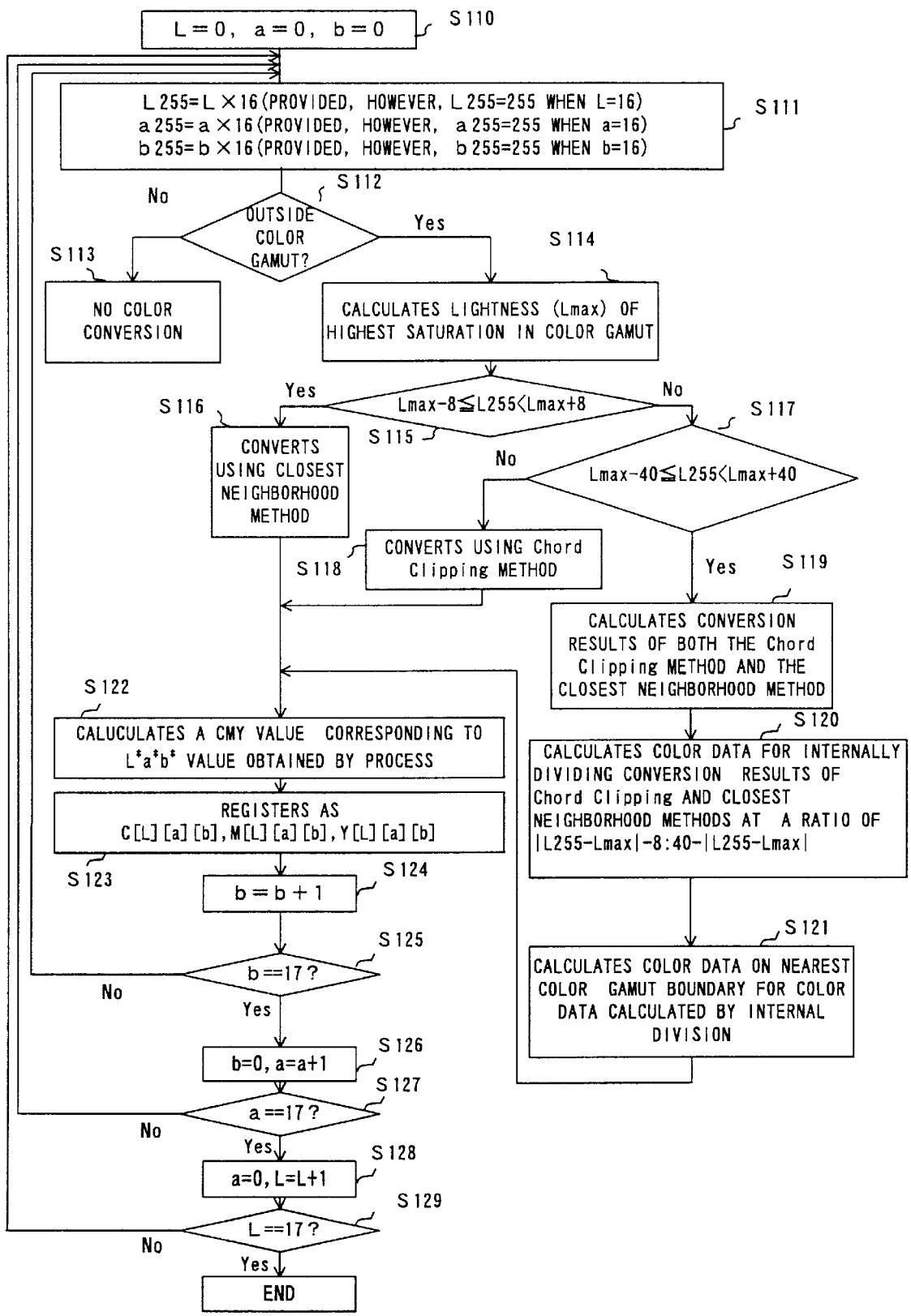
F I G. 16

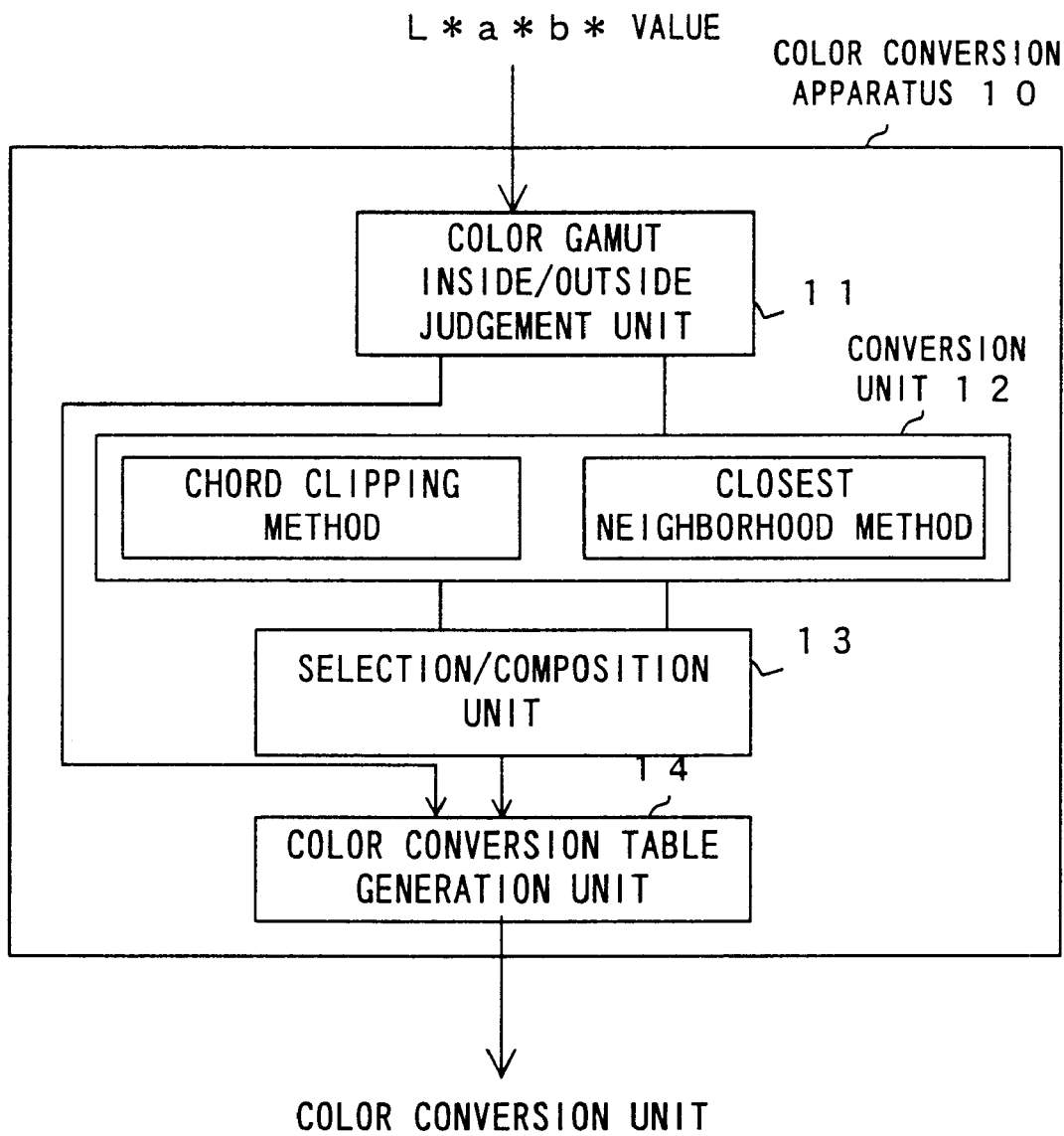
F I G. 1 7

COLOR DATA CONVERSION METHOD, COLOR DATA CONVERSION APPARATUS, STORAGE MEDIUM, DEVICE DRIVER AND COLOR CONVERSION TABLE

BACKGROUND OF THE INVENTION

1. Field of the Invention

The present invention relates to a color conversion technology (color gamut compression technology) for placing color data inside a specific color gamut.

2. Description of the Related Art

Generally speaking, a picture input/output device, such as a printer, display, etc., processes the colors of a picture using an RGB value, a CMY value, etc. However, even if a pixel with the same RGB value or CMY value is used, the color of it in the varies depending on an input/output device and the model to be used. Therefore, the RGB value and CMY value are color data values dependent on the manufacturer of an input/output device and the model to be used. For example, with a CMY value, the density information of three colors, cyan, magenta and yellow, is used as a numeric value to instruct a printer to print a color. For example, a C value, M value and Y value can have a value between 0 and 255, and by transmitting or outputting the C value, M value and Y value of a pixel composing an outputted picture, to a printer, the amount of cyan, magenta and yellow ink corresponding to the C value, M value and Y value are painted on a printing medium, such as paper, etc., for each pixel through the printing head of a printer under the control of the controller of the printer. Thus, a CMY value is an indexed numeric value for instructing the printing head as to the amount of cyan, magenta and yellow ink that should be painted for each pixel. However, even if the same CMY value is designated, an actually processed color varies depending on the manufacturer of an input/output device and the model to be used, since the kind of ink to be used and the ink painting mechanism varies depending on the manufacturer of an input/output device and the model to be used. The same phenomenon occurs in the case of a display in which an RGB value is used. In the case of a display value, a variety of colors of a color picture are processed by instructing a display as to the degree of lightness (gradation) for each of red, green and blue for each pixel using the numeric values R, G and B.

There is a method for processing color data that is independent of an input/output device and is based on absolute color data values (L*a*b*, XYZ, etc.), which serves to unify output colors among a variety of input/output devices. For example, in order to output a color of a certain L*a*b* value on a printer, it is sufficient to convert the L*a*b* value to an appropriate CMY value according to the color processing characteristics of the CMY value of each printer and to transmit the CMY value to a printer to print the color. Basically, by compensating for color processing characteristics, all printers can print the same picture in the same colors. A technology to convert color data between different color data values (for example, from an L*a*b* value to a CMY value, as described above) like this is termed a color conversion technology. Generally speaking, in a color conversion technology, a table in which the color correspondence between an intermediate color space, such as an L*a*b* space, etc., and a device-dependent color space, such as a CMY space, RGB space, etc., is registered (color conversion table) is prepared, and colors to be actually outputted to a device (CMY value, RGB value, etc.) are obtained by converting colors by referring to the table. Colors which are not registered in the table are converted and obtained by executing an interpolation process using data registered in the table.

In order to put the color conversion technology into practice, it is necessary to take into consideration only a color range for which a device can output colors (color gamut). More specifically, in order to output color data which are outside the range of a color gamut, to a printer or display, it is necessary to convert the values of the color data to values contained within the range of the color gamut. Such a technology to place color data which are outside the range of a color gamut and within the range of the color gamut of a device is called a color gamut conversion technology. Essentially, color conversion technology, it is important to convert color data to a color that is as close as possible to its color data value before before being outputted.

Therefore, to output colors in a wide range, including colors other than those in the color gamut of a device, that are as close to the original color as possible, both an accurate color conversion technology that converts different color data values and a color gamut conversion technology that changes the color as little as possible are required.

Here, first a case where an L*a*b* value is converted to a CMY value using a color conversion table in which CMY values corresponding to the colors of L*a*b* values distributed in a grid shape in an L*a*b* space are registered is described as an example of color conversion technology using an interpolation operation.

Usually, in an L*a*b* space L* takes a value in the range of 0 to 100, and a* and b* take a value in the range of −128 to 127. However, in the following description, 2.55 times an ordinary value is used for an L* value, and an ordinary value plus 128 is used for a* and b* values for convenience (L255* value, a255* value, b255* value). This is because an L* value, a* value and b* value can be handled as a value in the range of 0 to 255.

It is assumed that colors distributed in a grid shape in an L*a*b* space (in the following example, 0, 32, 64, 96, 128, 160, 192, 224 and 255 are the 9 values used for the L255* value, a255* value and b255* value), which are color values after conversion (CMY value) corresponding to colors of a conversion source (L255* value, a255* value, b255* value), are stored in the color conversion table in which colors are distributed in a grid shape. Specifically, it is assumed that a C value, M value and Y value are stored in the following three-dimensional arrays: C [L] [a] [b], M [L] [a] [b] and Y [L] [a] [b]. L, a and b are the numbers of a grid point in the L*a*b* space (grid number). For example, the grid numbers corresponding to the minimum value (0, 0, 0) of (L255* value, a255* value, b255* value) are L=1, a=0, b=0, grid numbers corresponding to (32, 0, 0) are L=1, a=0, b=0, and grid numbers corresponding to (32, 128, 128) are L=1, a=4, b=4.

An example of a color conversion is given below. For the conversion, a method for performing an interpolation operation using eight points (in the shape of a cubic grid) surrounding an L255* value, a255* value, b255* value (Lconv, aconv, bconv) to be converted is adopted. Lconv, aconv and bconv are variables indicating an L255* value, a255* value and b255* value, respectively.

FIG. 1 explains how to perform an interpolation operation.

(1) Selects Grid Points to be Used for Interpolation (Eight Points Surrounding an L*a*b* Value (Lconv, aconv, bconv) to be Converted (Selects a Cube)

In the following description, w is an interval between grids in the L*a*b* space, and is assumed to be 32 as described above. (int) indicates the omission of decimal places. L, a and b are grid numbers.

$$L=(int)(Lconv/w),$$
$$a=(int)(aconv/w),$$
$$b=(int)(bconv/w) \quad (1)$$

In addition to the grid point (L, a, b) calculated by the above equations (1), grid points of (L+1, a, b), (L, a+1, b), (L, a, b+1), (L, a+1, b+1), (L+1, a, b+1), (L+1, a+1, b) and (L+1, a+1, b+1) are used for interpolation operation. These eight grid points are the vertices of a cube 100 shown in FIG. 1.

(2) Calculates Positions Inside a Cube

Calculates the positions (Lw, aw, bw) inside the cube 100 of an L*a*b* value using the following equations (2).

$$Lw=(Lconv/w-L)\cdot w$$
$$aw=(aconv/w-a)\cdot w$$
$$bw=(bconv/w-b)\cdot w \quad (2)$$

(3) Calculates Weight Coefficients (the Volumes of Rectangular Parallelepipeds Generated by Dividing (V (0, 0, 0) to V (1, 1, 1); and Calculates the Volume of Rectangular Parallelepipeds Surrounded by Dotted Lines Shown in FIG. 1)

Calculates their volumes from the positions (Lw, aw, bw) inside the cubic of the L*a*b* value using the equations (3).

$$V(0, 0, 0)=(w-Lw)\cdot(w-aw)\cdot(w-bw)$$
$$V(1, 0, 0)=Lw\cdot(w-aw)\cdot(w-bw)$$
$$V(0, 1, 0)=(w-Lw)\cdot aw\cdot(w-bw)$$
$$V(0, 0, 1)=(w-Lw)\cdot(w-aw)\cdot bw$$
$$V(0, 1, 1)=(w-Lw)\cdot aw\cdot bw$$
$$V(1, 0, 1)=Lw\cdot(w-aw)\cdot bw$$
$$V(1, 1, 0)=Lw\cdot aw\cdot(w-bw)$$
$$V(1, 1, 1)=Lw\cdot aw\cdot bw \quad (3)$$

(4) Performs an Interpolation Process

Calculates means weighted with the V (0, 0, 0) to V (1, 1, 1) of the CMY value of (L, a, b), (L+1, a, b), (L, a+1, b), (L, a, b+1), (L, a+1, b+1), (L+1, a, b+1), (L+1, a+1, b) and (L+1, a+1, b+1).

$$C=(C[L][a][b]\cdot V(0, 0, 0)+$$
$$C[L+1][a][b]\cdot V(1, 0, 0)+$$
$$C[L][a+1][b]\cdot V(0, 1, 0)+$$
$$C[L][a][b+1]\cdot V(0, 0, 1)+$$
$$C[L][a+1][b+1]\cdot V(0, 1, 1)+$$
$$C[L+1][a][b+1]\cdot V(1, 0, 1)+$$
$$C[L+1][a+1][b]\cdot V(1, 1, 0)+$$
$$C[L+1][a+1][b+1]\cdot$$
$$V(1, 1, 1)/(w\cdot w\cdot w)$$
$$M=(M[L][a][b]\cdot V(0, 0, 0)+$$
$$M[L+1][a][b]\cdot V(1, 0, 0)+$$
$$M[L][a+1][b]\cdot V(0, 1, 0)+$$
$$M[L][a][b+1]\cdot V(0, 0, 1)+$$
$$M[L][a+1][b+1]\cdot V(0, 1, 1)+$$
$$M[L+1][a][b+1]\cdot V(1, 0, 1)+$$
$$M[L+1][a+1][b]\cdot V(1, 1, 0)+$$
$$M[L+1][a+1][b+1]\cdot V(1, 1, 1)/($$
$$w\cdot w\cdot w)$$
$$Y=(Y[L][a][b]\cdot V(0, 0, 0)+$$
$$Y[L+1][a][b]\cdot V(1, 0, 0)+$$
$$Y[L][a+1][b]\cdot V(0, 1, 0)+$$
$$Y[L][a][b+1]\cdot V(0, 0, 1)+$$
$$Y[L][a+1][b+1]\cdot V(0, 1, 1)+$$
$$Y[L+1][a][b+1]\cdot V(1, 0, 1)+$$
$$Y[L+1][a+1][b+1]\cdot V(0, 1, 1)+$$
$$Y[L+1][a+1][b]\cdot V(1, 1, 0)+$$
$$Y[L+1][a+1][b+1]\cdot V(1, 1, 1)/(w\cdot w\cdot w) \quad (4)$$

The preceding completes the summary of the color conversion method.

In the color conversion operation, a CMY value after conversion (C, M, Y) is calculated by referring to a CMY value registered in a table (which is composed of three-dimensional arrays, C [L][a][b], M [L][a][b] and Y [L][a][b], corresponding to cyan, magenta and yellow, respectively), as seen from equation (4). Therefore, data must be set in the CMY value of the table. Specifically, CMY values required for use in the interpolation process of equation (4), must be registered in the table. For this reason, it is also necessary to register an appropriate CMY value required to output an L*a*b* value for the grid points of an L*a*b* value located outside the color gamut of a printer.

For an L*a*b* value inside the color gamut which can be outputted by a printer, its CMY value can be set based on the actually measured value (L*a*b* value) outputted by the printer. For a method for obtaining correspondence between L*a*b* values and CMY values from the actually measured values outputted by the printer in order to generate a table, for example, a method described in the specification of Japanese Patent Application No. 9-241491 can be used. Although this actually measured value is, firstly, an L*a*b* value corresponding to the color of a grid point (CMY value), a table in which a CMY value corresponding to the point located in an L*a*b* space in a grid shape is registered using the method described in the specification of Japanese Patent Application No. 9-241491 and is generated based on this. L*a*b* values in this table are designated as the initial input of the present invention, which is described later.

For an L*a*b* value outside the color gamut of a printer, it is necessary to determine in advance an L*a*b* value inside the color gamut corresponding to the L*a*b* value outside the color gamut and to determine a CMY value corresponding to the L*a*b* value inside the color gamut. A process of determining an L*a*b* value inside the color gamut corresponding to the L*a*b* value outside the color gamut is color gamut conversion. In the color gamut conversion process it is important to change the colors as little as possible before conversion, and to maintain the relative balance between colors.

For information about conventional color conversion methods, please refer to the following literature.
J. Morovic, "To Develop A Universal Gamut Mapping Algorithm-Literature Survey", Design Research Center, University of Derby (1997).

In this literature, a chord clipping method is introduced as an example of high-performance color conversion technology.

FIG. 2 summarizes a chord clipping method.

FIG. 2 is a section view of an L*a*b* space which is divided on the plane of the same hue as a color to be converted. "sqrt" in FIG. 2 means to calculate the square-root of a value in parentheses. In the following description, "sqrt" has this meaning, unless otherwise stated.

As shown in FIG. 2, an achromatic color of the same hue as a color to be converted and of the same lightness (L*) as the color to be converted of the highest saturation (C*) is set on a lightness L* axis. A point representing a color to be converted: ("●") is connected with a point A on the lightness L* axis of the achromatic color using a straight line, and the color to be converted is converted toward the set achromatic color. When the point representing the color to be converted shifts toward a point A on the straight line, a point ("○") at which the color to be converted crosses the boundary of the color gamut D of a printer (in a broader sense, the color gamut of a printing device) is designated as a point indicating the color after conversion.

With another conventional technology, a method which performs a conversion to a color inside the nearest color gamut is also introduced. Hereinafter this is called the "closest neighborhood method".

FIG. 3 roughly explains the closest neighborhood method.

FIG. 3 is a section view of an L*a*b* space which is divided on a plane of the same hue as a color to be converted, as shown in FIG. 2.

The closest neighborhood method is designed to convert a color to a point which is at the shortest distance from the color to be converted on the boundary of the color gamut of a printer. There are several closest neighborhood methods. For example, there is a plane closest neighborhood method and a three-dimensional closest neighborhood method. The plane closest neighborhood method is designed to convert a point representing a color to be converted ("●") on a plane of the same hue as that of the point, and it is designed so that on this hue plane, the angle formed by both a straight line, connecting a point before conversion ("●") with a point after conversion ("○"), and a line indicating the boundary of the color gamut D1 of a printer always yields a right angle. However, the three-dimensional closest neighborhood method is designed to convert the color to be converted to a point located nearest to it on the boundary of the color gamut in three-dimensional space, without limiting the direction of conversion to the same hue plane as the point representing the color to be converted. Therefore, the straight line connecting a point before conversion and a point after conversion becomes perpendicular to the boundary surface of the color gamut including the point after conversion.

However, both the chord clipping method and the closest neighborhood method have the following problems.

First, the problems of the chord clipping method are described.

FIGS. 4A and 4B explain the problems of the chord clipping method.

The color gamut shown in FIG. 4A indicates the color gamut D2 of the yellow hue of a printer. In the yellow hue, the vertex MC (with the highest saturation and the brightest color) of the color gamut of the printer is biased to a relatively lighter color. Therefore, the color gamut border line b connecting the vertex and the point ML of the lightness (white) of the achromatic color has a very small inclination and is located fairly close to (immediately next to) the line of the equal degree of lightness. For this reason, when a color is converted using the chord clipping method, the saturation of a color with lightness than the lightness of the vertex MC will be greatly changed by conversion.

When a CMY value to be registered in a table is generated based on the conversion result obtained by this method, the following problems occur.

FIG. 4B shows both the situation of the shift due to conversion of the L*a*b* value of a grid point located on the color gamut boundary (yellow of high lightness) and the situation of color conversion performed by interpolation operation using the grid point. Black and white circles indicate the color of the grid point and the color after conversion. For the purpose of comparison FIG. 4C shows the conversion situation with the closest neighborhood method For a color located inside a color gamut D2, an L*a*b* value registered in a table outputs colors corresponding to the L*a*b* value of a grid point in an L*a*b* space to a printer, since there is no need to shift them in a conversion process. For a grid point located outside the color gamut D2, a CMY value which outputs a color corresponding to the L*a*b* value indicated by a white circle after converting it to a point indicated by a white circle, is registered.

A case where a color conversion is performed by interpolation operation using a registered table is studied. Although, generally speaking and as described earlier, the interpolation operation is performed in a three-dimensional space, it is described in FIG. 4B in such a way that it is performed by interpolation operation on a plane of the same hue as that used for convenience. For example, a CMY value is assumed to be obtained by performing a color conversion for an L*a*b* value marked by "x". Since the color indicated by "x" is located inside the color gamut D2, it is not originally required to be converted.

However, in the chord clipping method, an L*a*b* value indicated by "x" is calculated by the interpolation operation of a CMY value corresponding to an L*a*b* value (P1', P2') which is obtained after performing color gamut conversion for a CMY value indicated by a grid point located outside the color gamut D2. As shown in FIG. 4B, if a color conversion is performed in this situation, the amount of grid points P1 and P2 shift become large. Therefore, if a color conversion by interpolation operation is performed using the CMY value of a grid point (P1', P2') obtained from such a color gamut conversion, a CMY value corresponding to an L*a*b* value of which the saturation has been substantially degraded must be calculated. Thus, colors inside the color gamut D2 indicated by "x" in FIG. 4B have also been affected by the color gamut conversion and saturation is greatly degraded, which is a problem. Since originally colors inside the color gamut can be more faithfully reproduced without color conversion, it is a great problem. As clearly seen, if this result is compared with the result of the same color conversion performed by the closest neighborhood method, as shown in FIG. 4C (P1" and P2" shown in FIG. 4C are the shifted positions of the grid points P1 and P2), the reduced saturation of a point indicated by "x" becomes far larger in the case of the chord clipping method than in the case of the closest neighborhood method. Therefore, if the gradation is compared with that in the case of the closest neighborhood method, it is a big problem with the chord clipping method. In the following description this is called problem 1.

Next, the problem of the closest neighborhood method is described. As shown in FIG. 3, in this method, a color outside a color gamut D1 of which the saturation is higher than the vertex MC of the color gamut D1 and which has a fairly wide range S, for example, three colors located on the right side of FIG. 3 (three "●") are converted to the same color (the vertex MC of the color gamut D1). This is because a point on the boundary of the nearest color gamut D1 commonly becomes the vertex MC. Thus, many colors that were different before conversion all become the same color after conversion, and much of the balance between colors is lost, which is a problem. In the following description, this problem is called problem 2.

SUMMARY OF THE INVENTION

The object of the present invention is to provide a color gamut conversion technology for which the reduction in accuracy is small, when it is used simultaneously with a color gamut conversion technology by interpolation operation widely used as a high-speed and accurate color conversion.

The color conversion method of the present invention converts color data to color data inside a target color gamut, and comprises the steps of (a) judging whether color data to be converted are contained in an area predetermined for the target color gamut, and (b) converting the color data using one of at least two color gamut conversion methods or combining two or more color gamut conversion methods according to the judgment result in step (a) and outputting the result of the conversion.

The color conversion apparatus of the present invention converts color data to color data inside a target color gamut, and comprises a judging unit for judging whether color data to be converted are contained in an area predetermined for the target color gamut and a conversion unit for converting the color data using one of at least two color gamut conversion methods or combining two or more color gamut conversion methods according to the judgment by the judging unit and outputting the result of the conversion.

The color conversion table of the present invention converts colors displayed on a first device to colors which can be displayed on a second device, and both color data values generated by a color conversion method comprising the steps of (a) judging whether color data to be converted are contained in an area predetermined for the target color gamut and converting the color data using one of at least two color gamut conversion methods or combining two or more color gamut conversion methods according to the judgment result in step (a) and outputting the result of the conversion, and the color data values of the second device corresponding to them are registered therein.

The device driver of the present invention is designed for a second device, outputs colors displayed on a first device as colors which can be displayed on a second device, and includes a color conversion table in which both color data values generated by a color conversion method comprising the steps of (a) judging whether color data to be converted are contained in an area predetermined for the target color gamut and converting the color data using one of at least two color gamut conversion methods or combining two or more color gamut conversion methods according to the judgment result in step (a) and outputting the result of the conversion, and the color data values of the second device corresponding to them are registered.

According to the present invention, when performing a color gamut conversion in which color data located outside a target color gamut are converted to color data inside the target color gamut, at least two color gamut conversion methods with different characteristics are prepared. Depending on the position in which color data to be converted is located in a color gamut, the color data are converted to color data contained inside the target color gamut using a method in which a problem is unlikely to occur, out of at least two color gamut conversion methods. Alternatively, since the color data are converted by combining a plurality of color gamut conversion methods, or composing the conversion results of a plurality of color gamut conversion methods and a final conversion result, the occurrence of the problems of the respective color gamut conversion methods can be suppressed.

Accordingly, by using a device driver including a color conversion table, generated as a result of conversion, and driving a color picture output device (for example, a printer as a second device), a color picture can be outputted from a second device while the colors outputted by a first device are maintained as faithful to the originals as possible.

BRIEF DESCRIPTIONS OF THE DRAWINGS

FIG. 1 explains how to perform an interpolation operation.

FIG. 2 briefly explains the chord clipping method.

FIG. 3 briefly explains the closest neighborhood method.

FIGS. 4A to 4C explain the problem of the chord clipping method.

FIG. 5 is a simple flowchart showing a color data conversion method of the preferred embodiments of the present invention described later.

FIGS. 6A and 6B explain the color data conversion method of the first preferred embodiment of the present invention.

FIG. 7 is a flowchart showing how to generate a color conversion table in which the color gamut conversion method of the first preferred embodiment, shown in FIG. 2, which is the second preferred embodiment of the present invention, is applied.

FIGS. 8A and 8B explain a color gamut conversion method, which is the third preferred embodiment, of the present invention.

Figure 11:
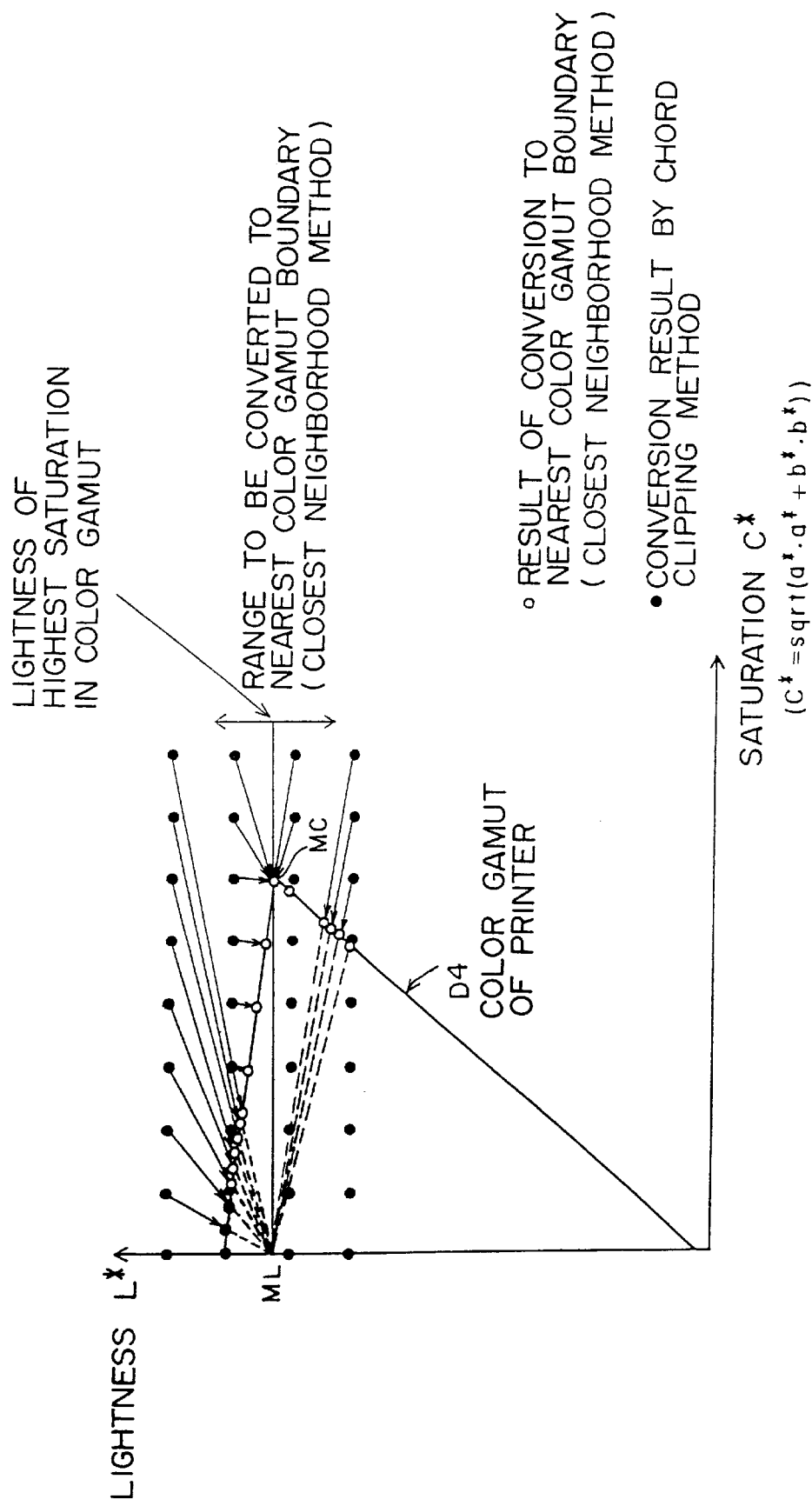

FIG. 11 explains a color gamut conversion method, which is the fifth preferred embodiment of the present invention.

Figure 1:
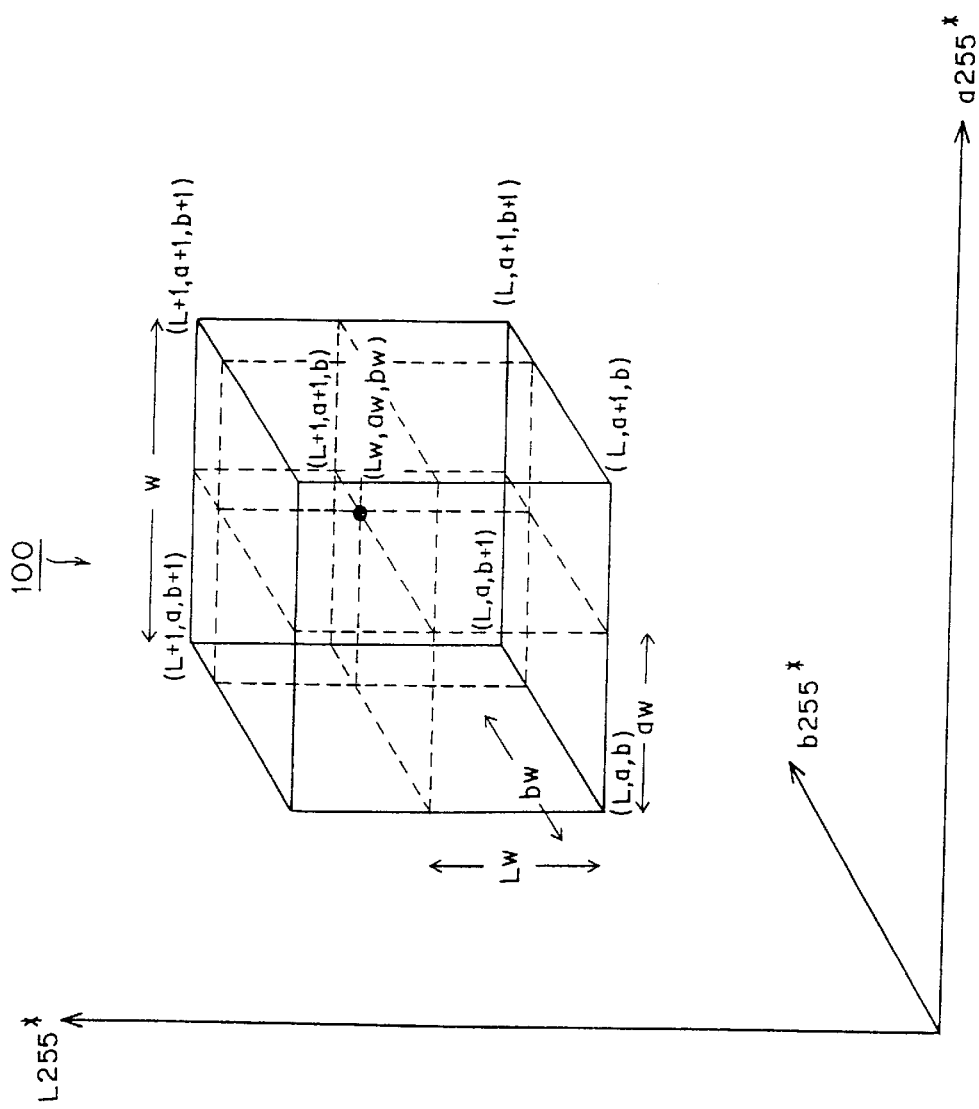
Figure 2:
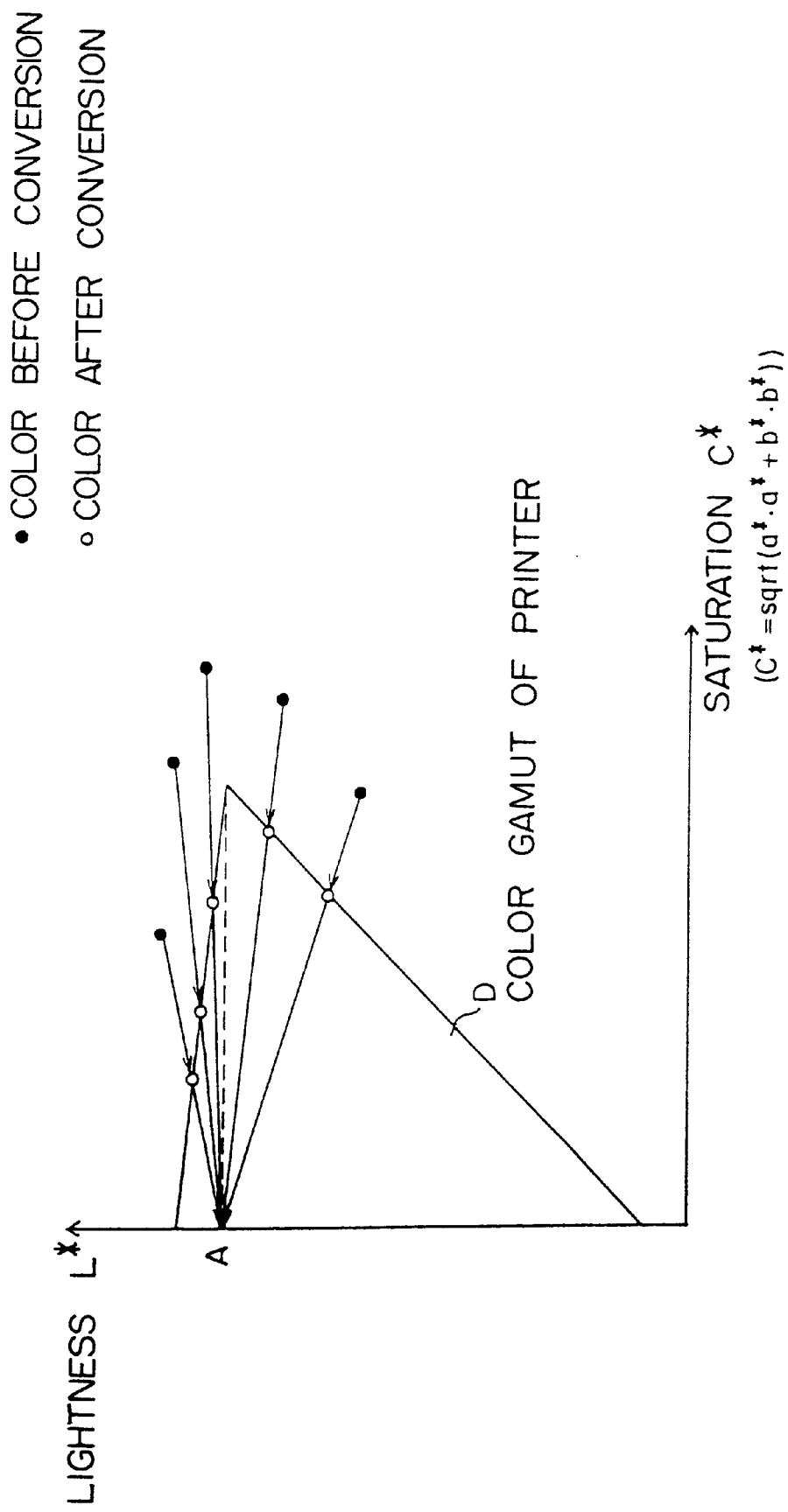
Figure 3:
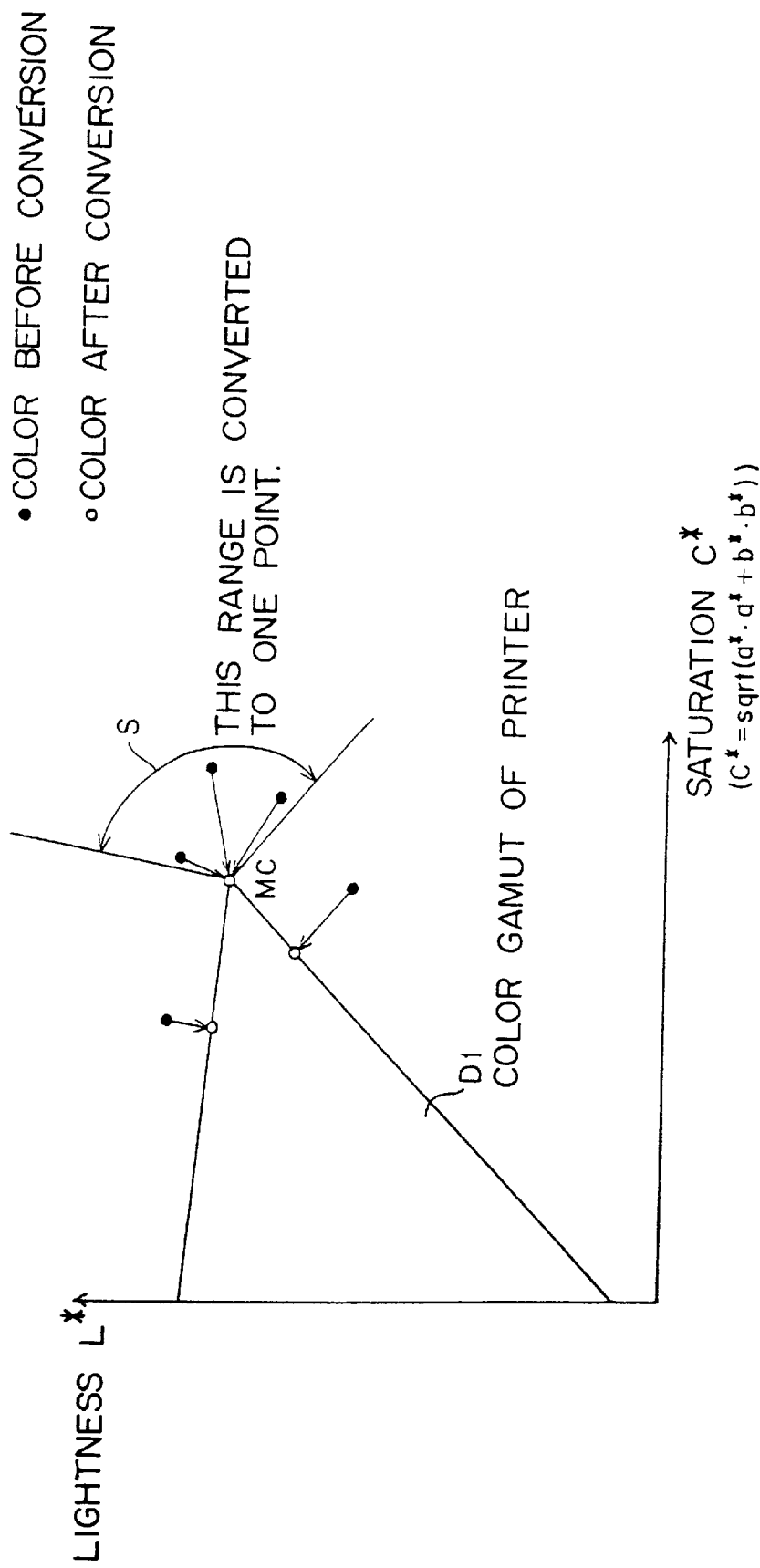
Figure 4:
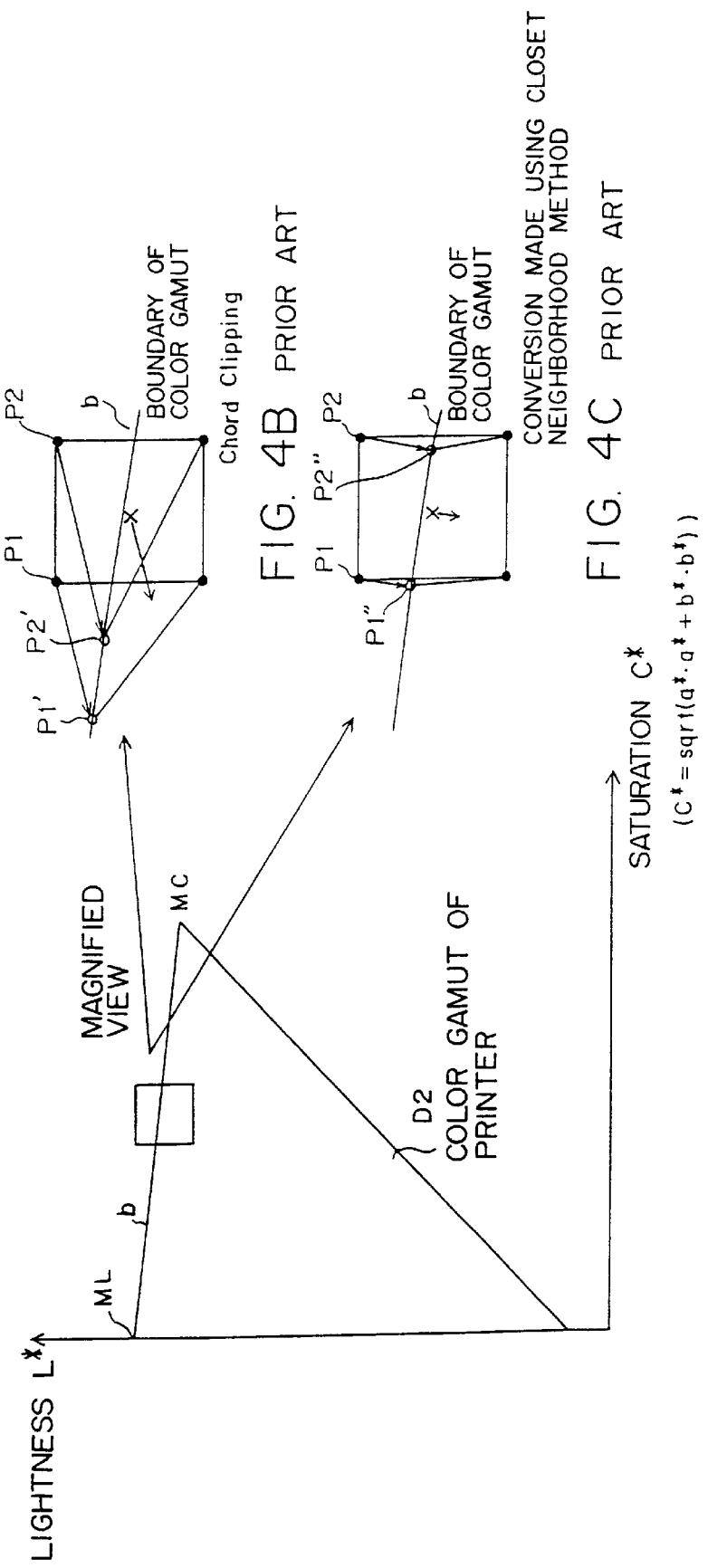
Figure 12:
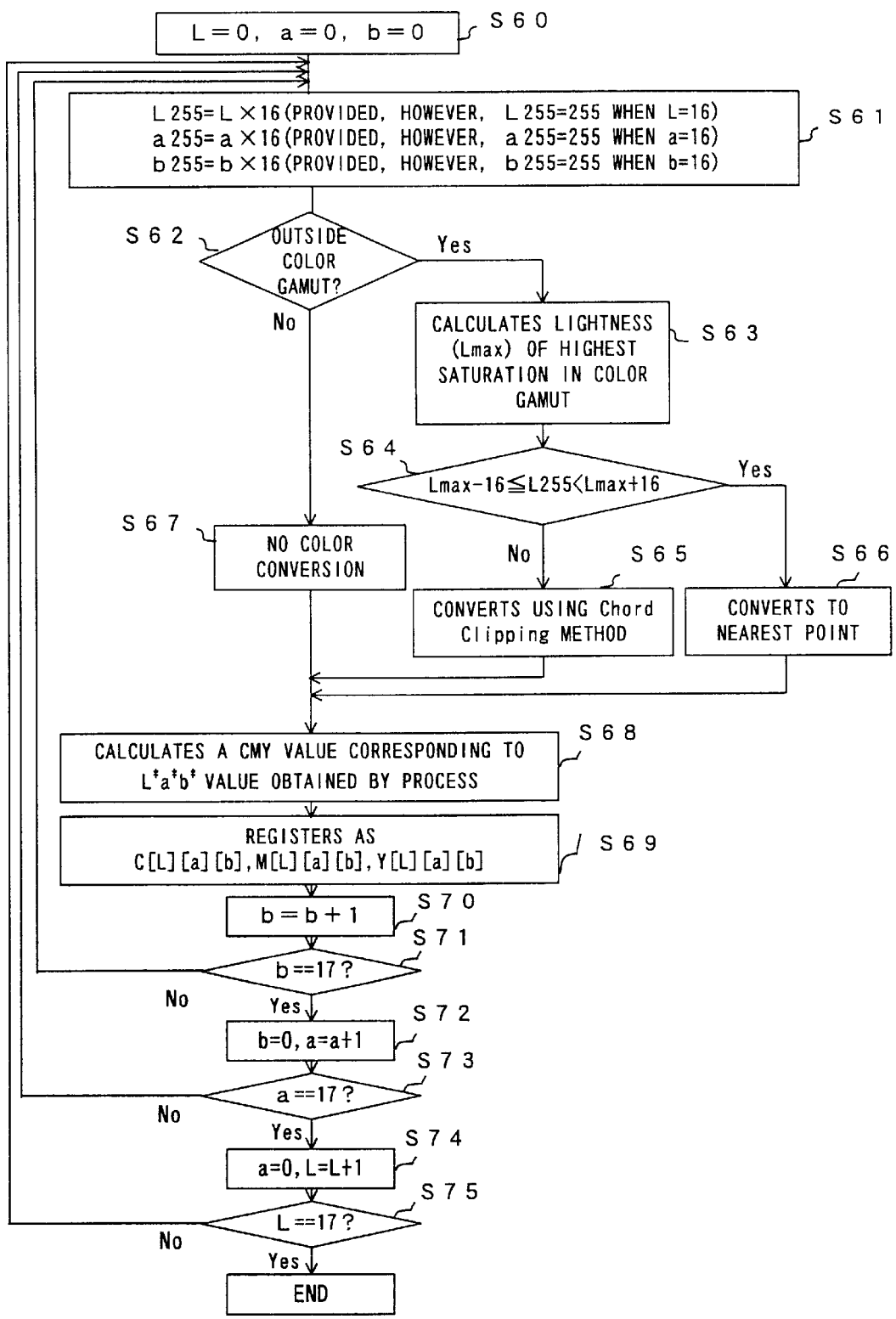

FIG. 12 is a flowchart showing how to generate a color conversion table in which the color gamut conversion method of the fifth embodiment, shown in FIG. 2, which is the sixth preferred embodiment of the present invention, is applied.

Figure 13:
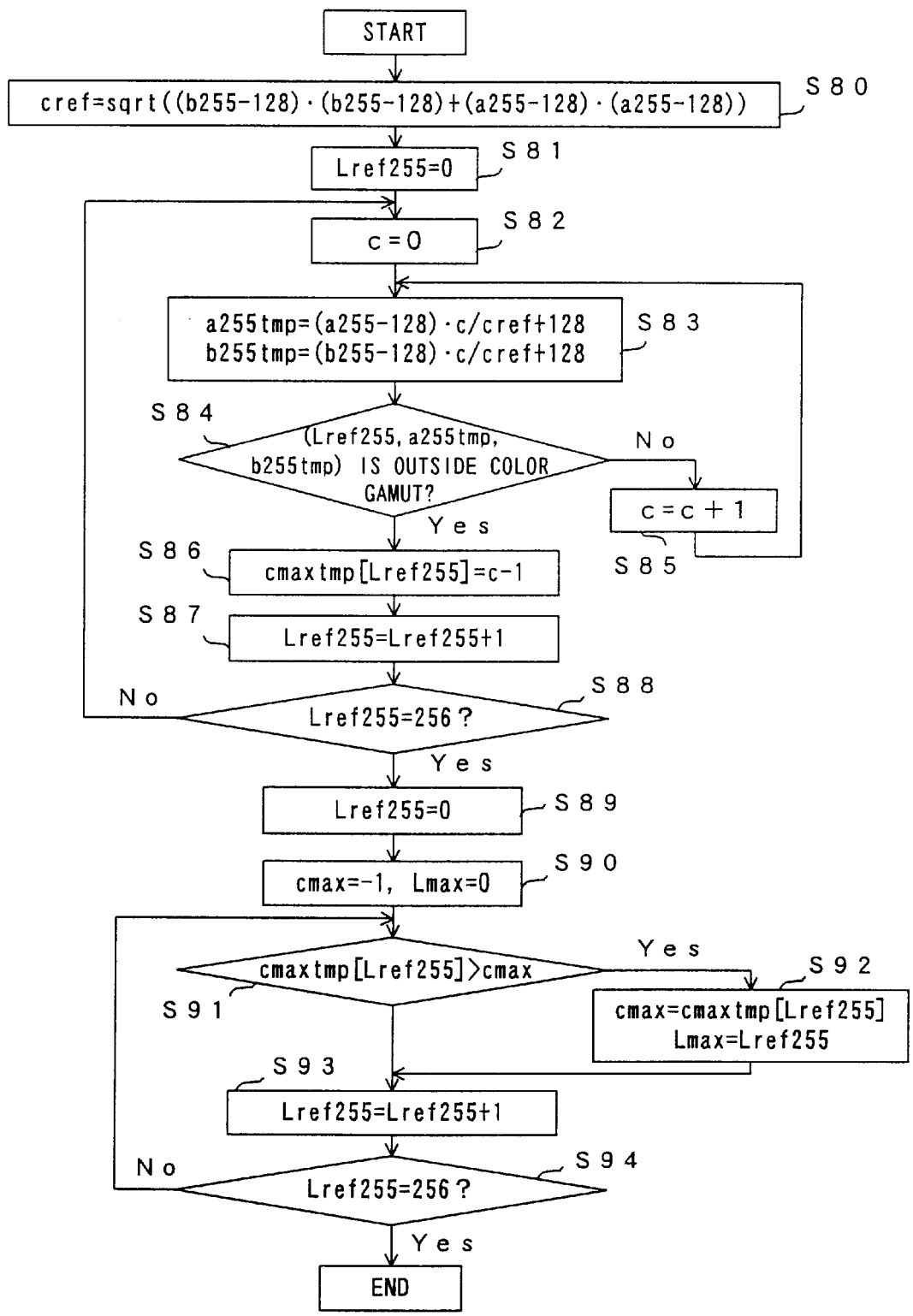

FIG. 13 is a detailed flowchart showing the calculating process of Lmax in step S63 of the flowchart shown in FIG. 12.

Figure 14:
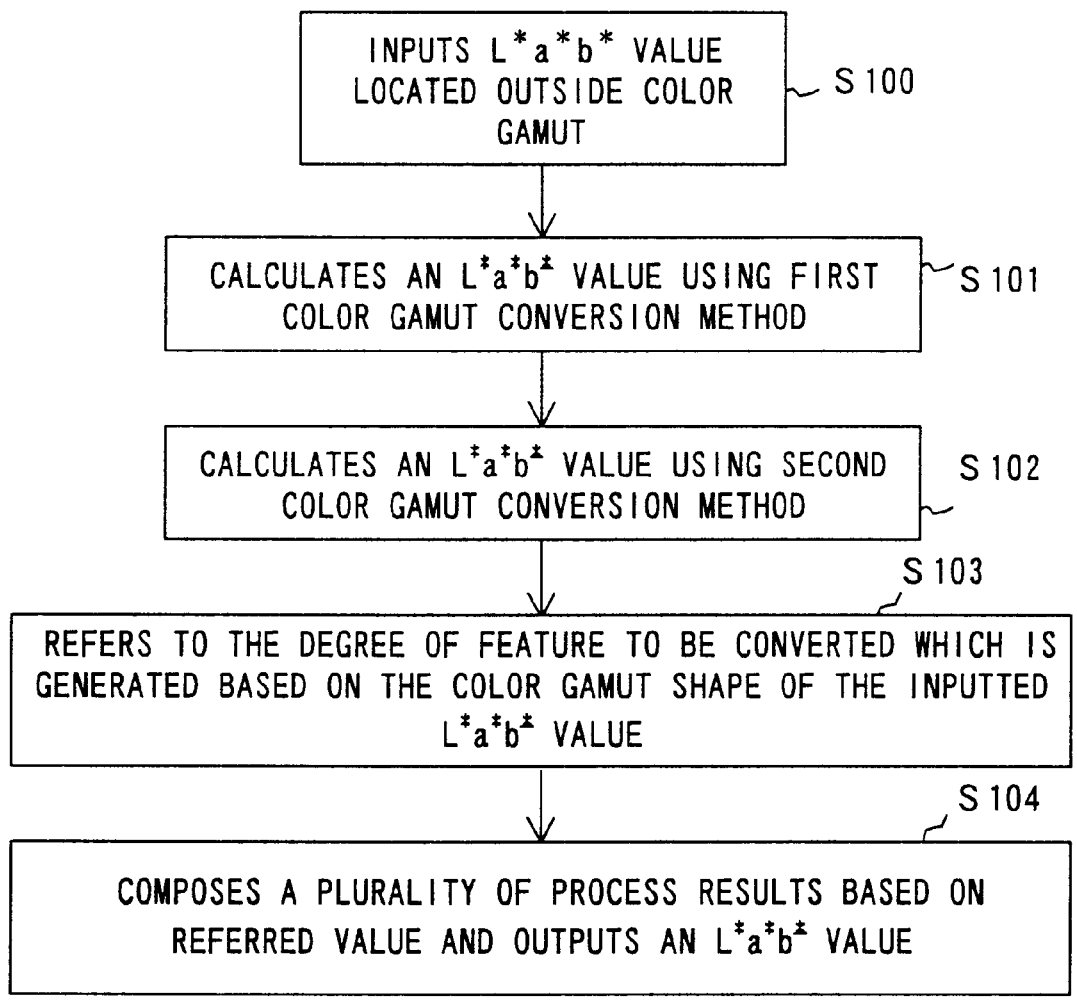

FIG. 14 is a simple flowchart showing the process of another preferred embodiment of the present invention.

Figure 15:
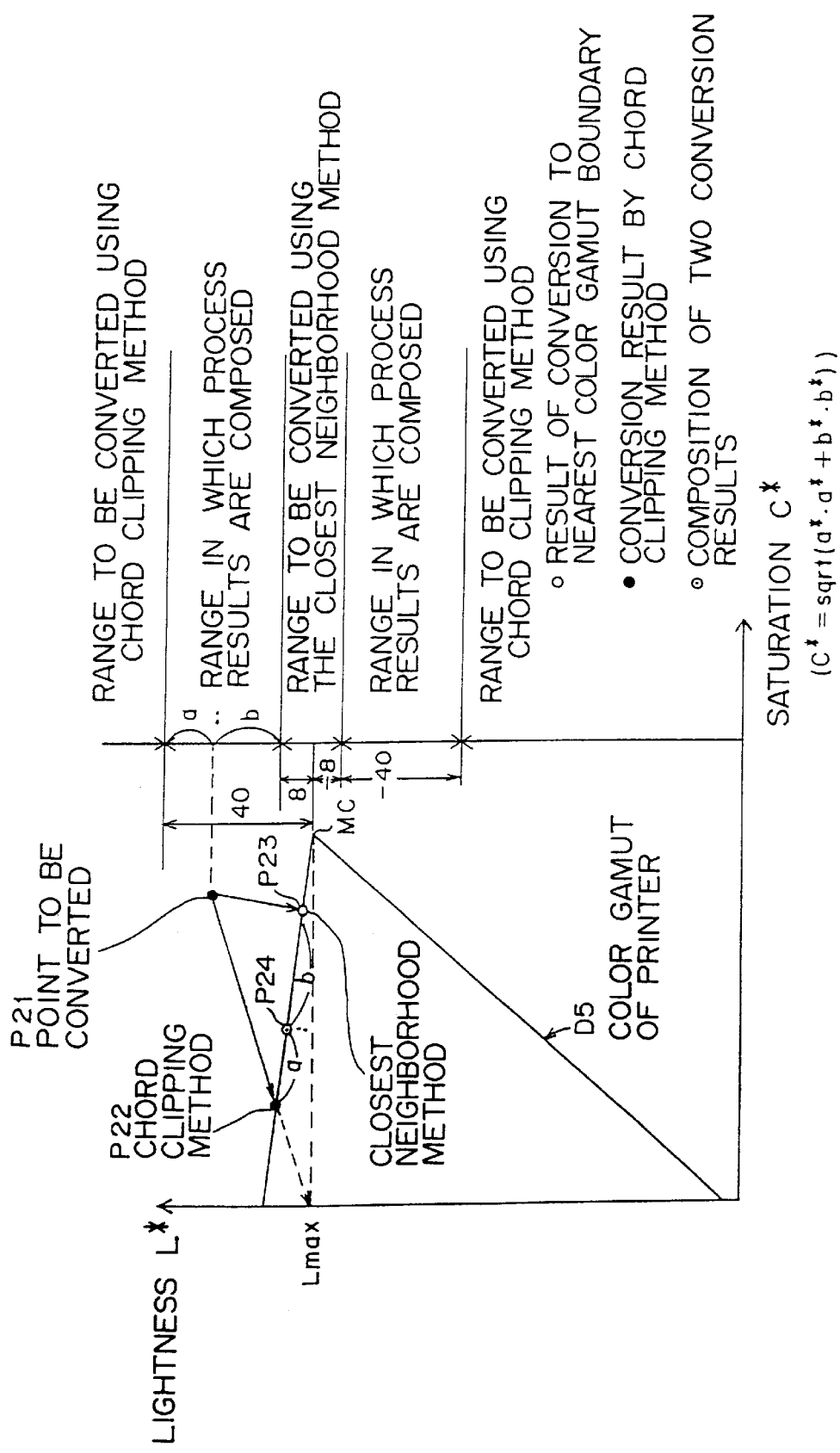

FIG. 15 explains a color gamut conversion method, which is the seventh preferred embodiment of the present invention.

FIG. 16 is a flowchart showing how to generate a color conversion table in which the color gamut conversion method of the seventh embodiment, shown in FIG. 2, which is the eighth preferred embodiment of the present invention, is applied.

FIG. 17 shows one embodiment of the above-mentioned color conversion apparatus, which is the ninth preferred embodiment of the present invention.

Figure 18:
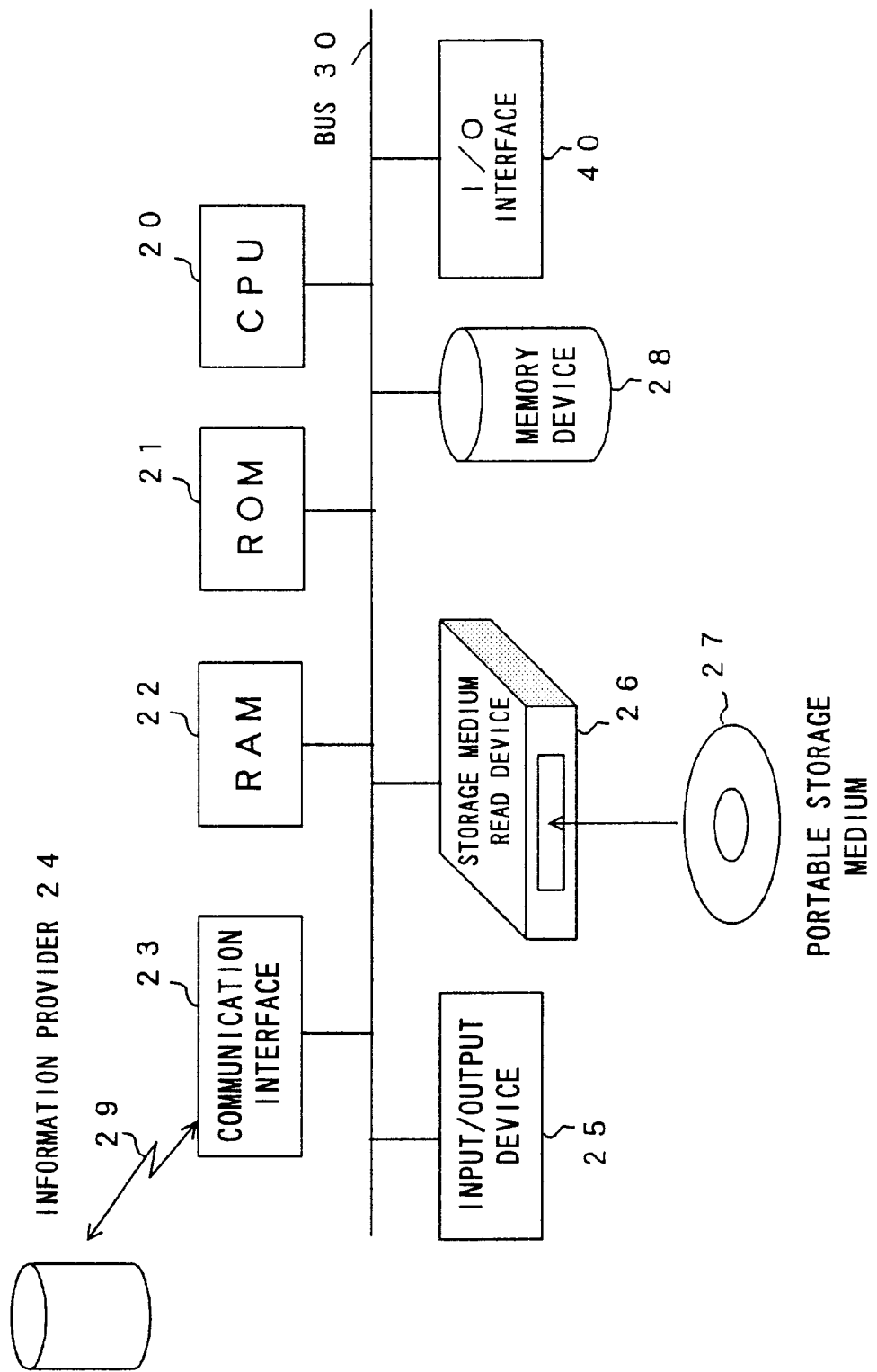

FIG. 18 shows a hardware environment needed to realize the method of the present invention by causing a computer to execute a program.

Figure 19:
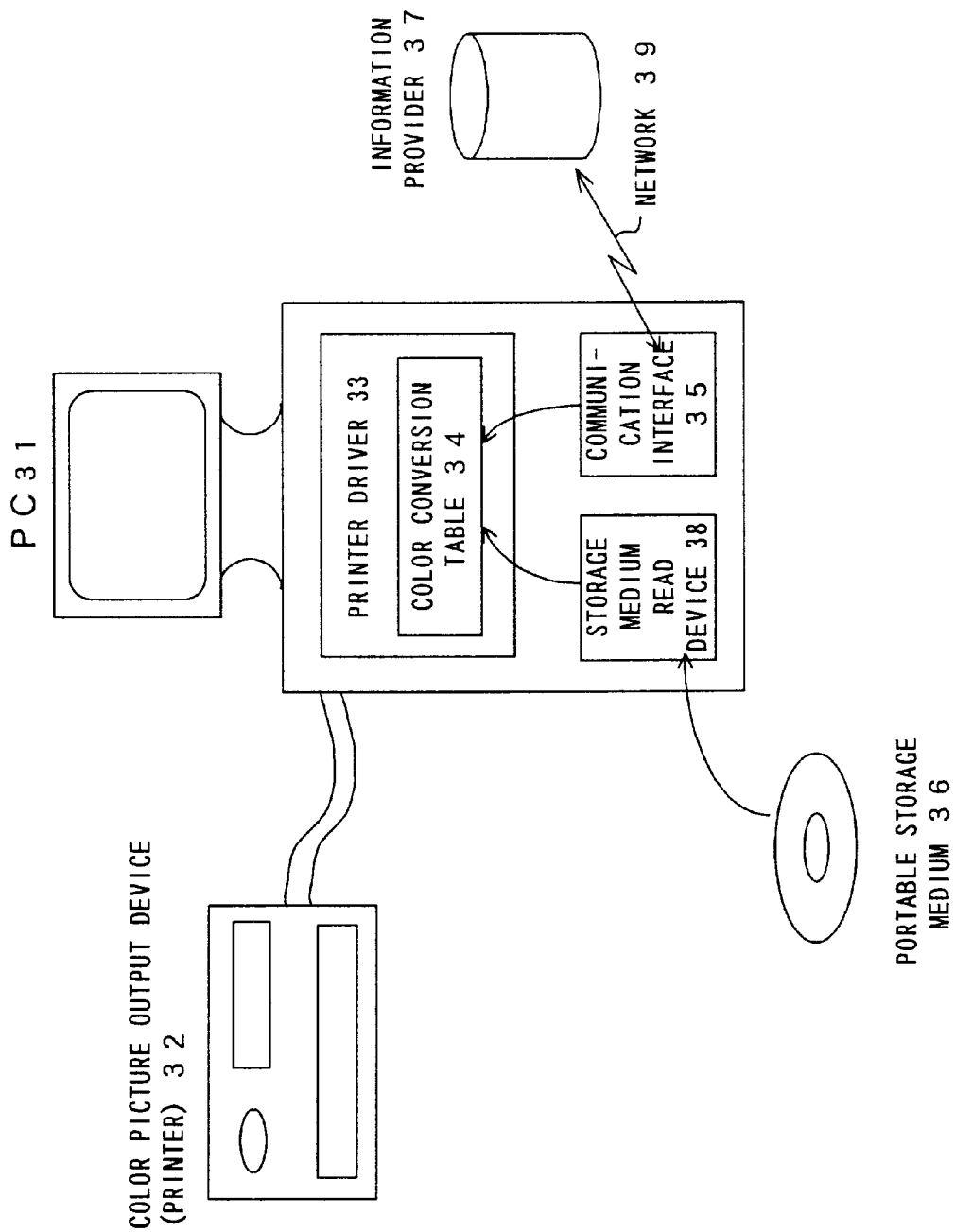

FIG. 19 explains the general usage of a color conversion table generated by the method of the present invention.

DESCRIPTION OF THE PREFERRED EMBODIMENTS

Figure 5:
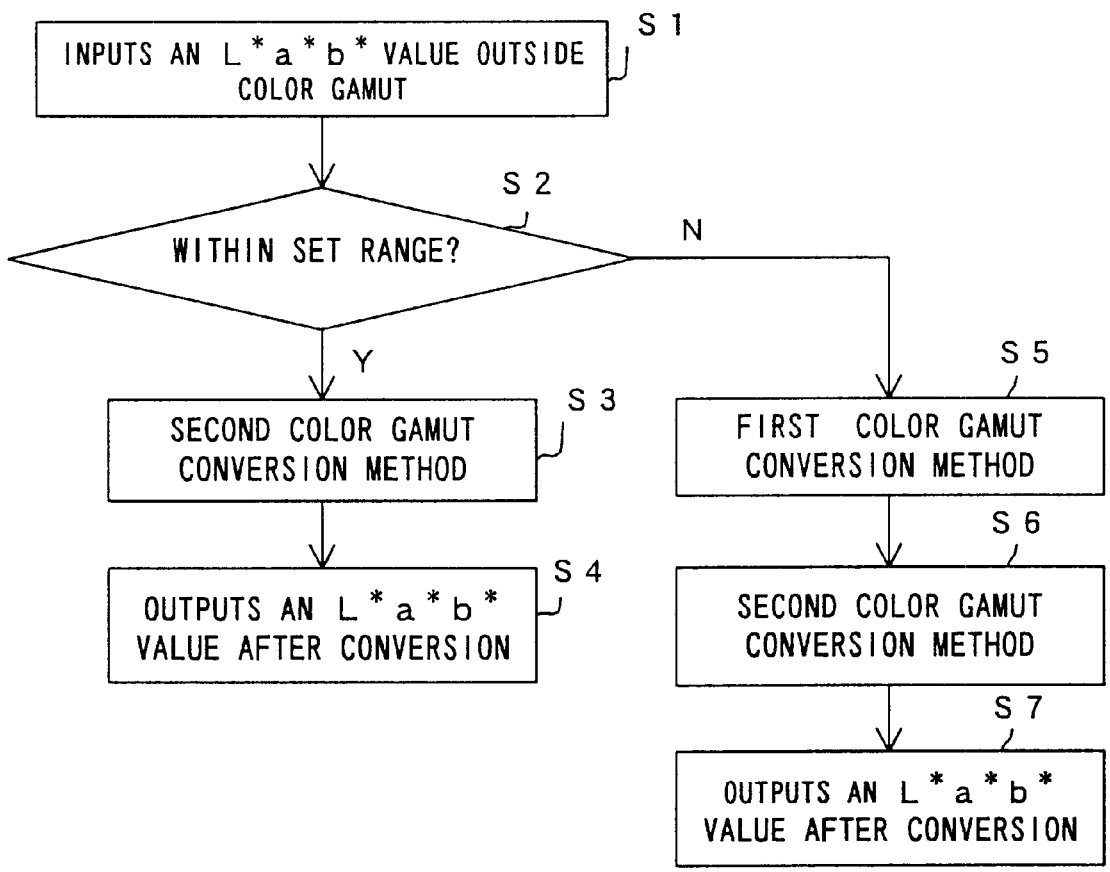

FIG. 5 is a simple flowchart showing a color data conversion method of the preferred embodiments of the present invention described later.

In the color data conversion method of this preferred embodiment, a method in which a color gamut conversion is performed by combining a first color conversion method and a second color gamut conversion method depending on a color corresponding to a grid point in an L*a*b* space and a method in which color gamut conversion is performed only by the second color gamut conversion method are switched. Specifically, only the second color gamut conversion method, in which problem 1 is not of great importance, is applied to an area in which problem 1 has an effect. However, after the first color gamut conversion method, in which problem 2 is not of great importance, is applied to an area in which problem 2 has an effect and is converted to another area in which problem 2 is not of great importance, and the area is processed by the second color gamut conversion method. In this way, the occurrence of both problems can be reduced.

As described above, the color data conversion method of this preferred embodiment has a plurality of different color gamut conversion processes for placing color data inside a color gamut, and gradually executes a color gamut conversion process depending on a color. According to the color data conversion method of this preferred embodiment, the occurrence of problems 1 and 2 can be reduced by applying only the second color gamut conversion method, in which problem 1 is unlikely to occur if a color to be converted is located near a color gamut boundary, and by gradually applying both the first color gamut conversion method, in which problem 2 is unlikely to occur, and the second color gamut conversion method in which problem 1 is unlikely to occur, in other cases.

With the gradual method, for example, a method for assuming an area somewhat wider than a target color gamut, regarding the area as the color gamut of a conversion destination, converting the area using the first color gamut conversion method and then converting the conversion result for the target color gamut using the second color gamut conversion method, a method for converting color data to the target color gamut using the first color gamut conversion method, then obtaining a color corresponding to a point on the line connecting color data before conversion hand color data after conversion and converting the corresponding color using the second color gamut conversion method, etc. can be considered.

With the color data conversion method, in which problem 1 is unlikely to occur, for example, a method for processing so as to reduce the amount of color data shift can be considered. For such a method, for example, a plane closest neighborhood method or a three-dimensional closest neighborhood method, described earlier, can be used.

If the conversion result of the color data conversion method of this preferred embodiment or a table for a color conversion process in which the color data values of a device corresponding to the conversion results are registered is to be used, the occurrence of problems 1 and 2 can be reduced when performing a color conversion by an interpolation operation.

Next, the color data conversion method of this preferred embodiment is described with reference to FIG. 5.

First, in step S1, the L*a*b* value of a grid point in an L*a*b* space corresponding to a color located outside the color gamut of a target device to be used for a color gamut conversion (for example, the color gamut of a printer) is inputted. Then, in step S2, it is judged whether this L*a*b* value is located within a predetermined range. Here, a predetermined range is a range in which problem 1 is likely to occur, and in particular, is an area in the neighborhood of a color gamut boundary. If a first color gamut conversion method is applied when a color corresponding to an L*a*b* value to be converted is contained in this neighborhood area, the influence of problem 1 becomes great. Therefore, in step S3, a second color gamut conversion method is applied to convert the L*a*b* value, and in step S4, an L*a*b* value after conversion is outputted. If in step S2, a color corresponding to an L*a*b* value to be converted is contained in the color gamut boundary, in step S5, the L*a*b* value is converted using the first color gamut conversion method in which problem 2 does not occur. Then, in step S6, the L*a*b* value obtained by the conversion is converted using the second color gamut conversion method in order to suppress problem 1. Then, in step S7, the L*a*b* value obtained by the second color gamut conversion method is outputted as a final L*a*b* value after conversion.

In the above description, for a conversion method for combining the first and second color gamut conversion methods, two methods for first, converting color data using the first color gamut conversion method so as to shift the color data to a point near a color gamut boundary, then shifting the point near the color gamut boundary to a point on the boundary of a target color gamut using the second color gamut conversion method, and a method for first, shifting color data to a point on the target color gamut boundary using the first color gamut conversion method, shifting the point obtained by the first conversion to an intermediate point, and then converting the intermediate point to an appropriate point on the target color gamut boundary using the second color gamut conversion method to obtain a final conversion point are exemplified. However, the combined method is not limited to these two, and other combined methods properly combining the first and second color gamut conversion methods so as to suppress the occurrence of both problems 1 and 2 can also be adopted.

The L*a*b* value after color compression is performed in step S4 or S7 is registered in a color conversion table, and is used for an interpolation operation in the case when a device, such as a printer, outputs an arbitrary color, etc.

Figure 6:
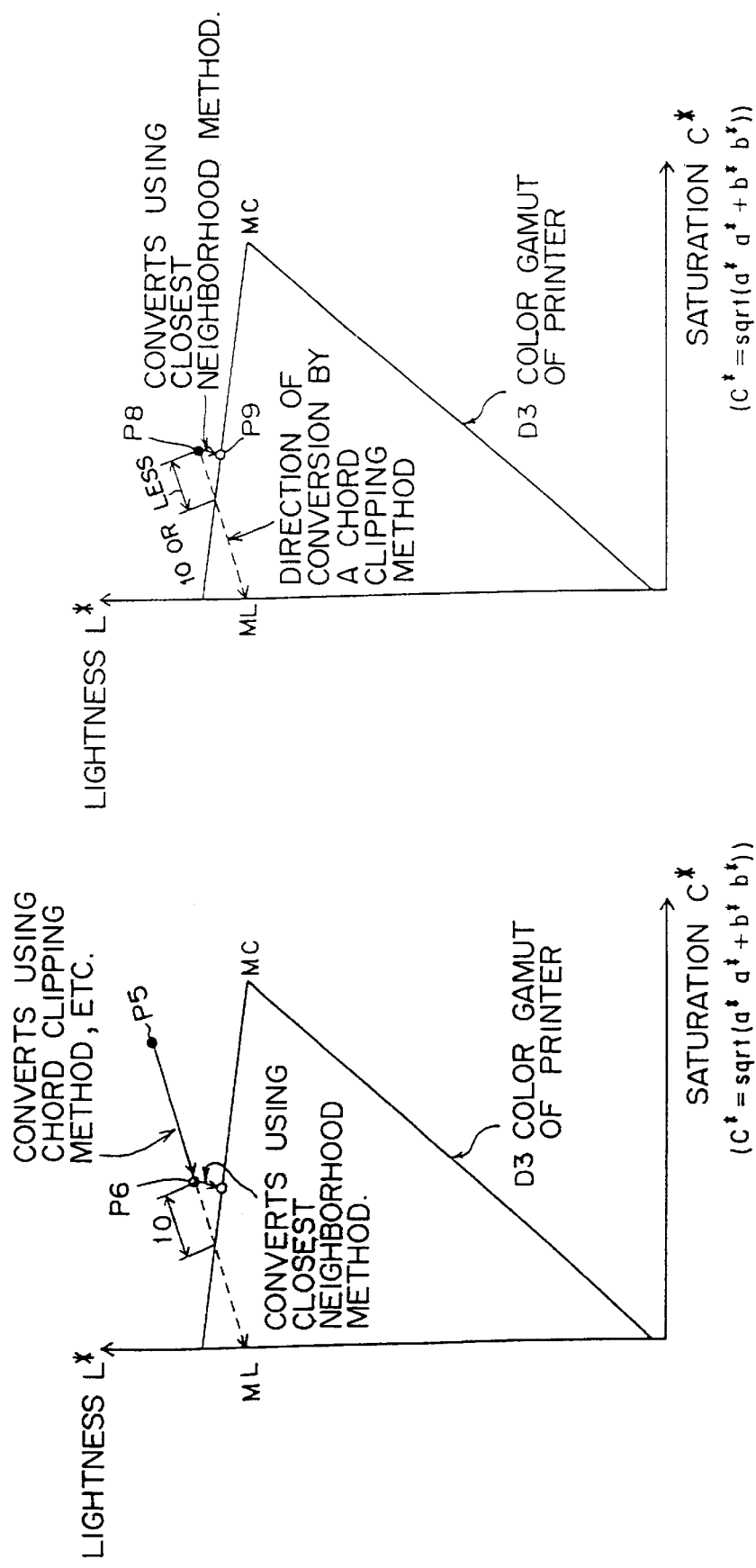

FIGS. 6A and 6B explain the color data conversion method of the first preferred embodiment of the present invention.

As shown in FIG. 6A, first, a point P5 representing a color outside a color gamut D3 of a printer is converted toward a point ML of achromatic color on the lightness axis L* using the chord clipping method. At this time, the lightness of point ML is the same as that of point MC of the highest saturation inside the color gamut D3 of the printer. When color data are converted using the chord clipping method, a conversion point is shifted (converted) to the intersecting point between a straight line connecting a point to be converted and point ML (hereinafter called "chord clipping conversion straight line") and a color gamut boundary. Then, a distance (amount of conversion) between the point to be converted and the boundary of the color gamut D3 is measured along the straight line.

Then, as shown in FIG. 6A, with the conversion result of the chord clipping method, a distance between a point P5 to be converted and the boundary of the color gamut D3 along the chord clipping conversion straight line is greater than a predetermined value (10 here), and point P5 to be converted is shifted to a point P6 which is located at the predetermined value (distance) on the chord clipping straight line toward a direction from the boundary of the color gamut D3 of the printer to point P5 to be converted. Then, the closest neighborhood method is applied to point P6. As described above, the closest neighborhood method converts the point to be converted to a point on the color gamut boundary closest to the point to be converted. Actually, a circle (if a plane closest neighborhood method is used) or sphere (if a three-dimensional closest neighborhood method is used) of a predetermined radius with the point to be converted to the center is formed, and it is judged whether the circle or sphere touches the color gamut boundary. If it does not touch the boundary, the radius of the circle or sphere is increased a little and it is judged again whether the new circle or sphere touches the color gamut boundary. A contact point on the color gamut at which the color gamut boundary and a circle or sphere come into contact is obtained by repeating such a process and gradually increasing the radius of the circle or sphere. When the contact point is obtained, the point to be converted is shifted to the contact point and a color gamut conversion for one point located outside a color gamut is completed.

However, as shown in FIG. 6B, with the conversion result of the chord clipping method, a distance between a point P8 to be converted and the boundary of the color gamut D3 along the chord clipping conversion straight line is less than a predetermined value, for example 10, so the closest neighborhood method is applied to point P8 to be converted. Therefore, point P8 to be converted is converted from the original position to a point P9 on the color gamut boundary closest to the point to be converted.

Although in this way, first a chord clipping method is applied to the point to be converted, and usually a chord clipping method containing problem 1 is applied only to a point located at a distance greater than a predetermined value, and only the closest neighborhood method is usually applied to a point located at a distance that is less than the predetermined value. According to this method, a point far from the color gamut boundary is first converted to the color gamut boundary using the chord clipping method in order to suppress the occurrence of problem 2, then it is converted to the neighborhood of the color gamut boundary on the chord clipping straight line, and finally the closest neighborhood method is applied to it. Accordingly, the occurrence of both problems 1 and 2 can be suppressed.

Figure 7:
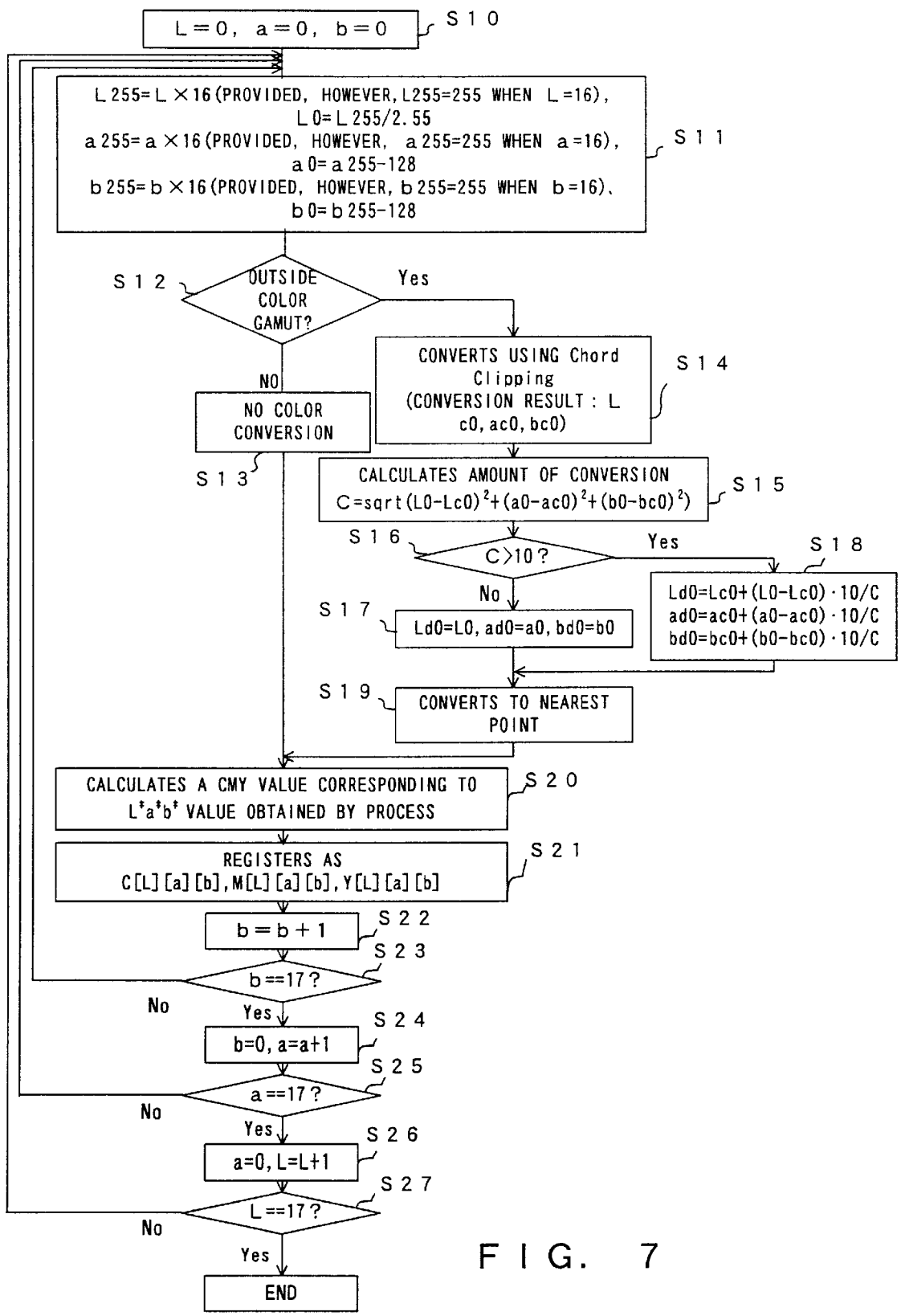

FIG. 7 is a flowchart showing how to generate a color conversion table, which is the second preferred embodiment of the present invention, in which the color gamut conversion method of the first preferred embodiment shown in FIGS. 6A and 6B is applied.

In the process shown in the flowchart, a color conversion table for printers for converting L*a*b* values to CMY values is generated. For a process used to obtain CMY value corresponding to an L*a*b* value distributed in a grid shape based on the measurement value of a patch outputted from the printer in this second preferred embodiment, a method described in the specification of the Japanese Patent Application No. 9-241491 is assumed to be used. These L*a*b* values obtained by measuring the patch outputted from the printer correspond to the CMY values of grid points in a CMY space, and the L*a*b* values are not distributed in a grid shape. By using the method described in the specification of the Japanese Patent Application No. 9-241491, the L*a*b* values are distributed in a grid shape, allowing a table for storing CMY values corresponding to the grid points in the L*a*b* space to be generated. The L*a*b* values in this table are designated as the input initial values of the second preferred embodiment. For a method for judging whether a certain L*a*b* value is located inside a color gamut (or outside the color gamut), a method described in the specification of Japanese Patent Application No. 9-206741 is assumed to be used.

In this second preferred embodiment, described earlier, it is assumed 2.55 times an ordinary value is used for an L* value and an ordinary value plus 128 is used for a* and b* values (L255* value, a255* value, b255* value).

A color conversion table in which colors after conversion (CMY values) corresponding to colors distributed in a grid shape with (L255* value, a255* value, b255* value) (17 values of 0, 16, 32, 48, 64, . . . , 224, 240 and 255 in the following example) are stored, is generated.

The conversion of a color gamut is performed by processing colors corresponding to grid points distributed in a grid shape in an L*a*b* space in order, and CMY values corresponding to the colors are calculated. The color conversion table can be generated by storing these calculated CMY values in three three-dimensional arrays: C [L] [a] [b], M [L] [a] [b] and Y [L] [a] [b]. L, a and b are the numbers of the grid point, and for example, grid numbers corresponding to the minimum value (0, 0, 0) of the L255* value, a255* value and b255* value are L=0, a=0 and b=0. Grid numbers corresponding to (16, 0, 0) are L=1, a=0 and b=0, and grid numbers corresponding to (16, 128, 128) are L=1, a=8 and b=8.

The flowchart shown in FIG. 7 is described below.

First, in step S10, L, a and b, which are variables indicating the grid numbers of a grid point in an L*a*b* space, are all initialized to "0". Then, an L255* value, an a255* value and a b255* value are obtained by multiplying L, a and b by 16, respectively, and are assigned to variables L255, a255 and b255, respectively. Provided, however, that when L, a and b=16, the L255* value, a255* value and b255* value are all assumed to be "255". An ordinary L* value is obtained by dividing the value of L255 by 2.55 and the a* value and b* value are obtained by subtracting 128 from the values of a255 and b255, respectively, which are assigned to variables L0, a0 and b0, respectively (step S11). Then, it is judged whether a color corresponding to the L*a*b* value (L0a0b0 value) obtained in this way, is located outside the color gamut (step S12). If it is located inside the color gamut, in step S13, no color conversion is performed, and the flow proceeds to step S20. If it is located outside the color gamut, first, the L*a*b* values of the grid point located outside the color gamut which are assigned to the variables L0, a0 and b0, respectively, are converted to L*a*b* values on the color gamut boundary using the chord clipping method. Then, the L* value, a* value and b* value, which are obtained by the conversion, are assigned to variables Lc0, ac0 and bc0, respectively (step S14). Then, the amount of conversion C of the L*a*b* value which is obtained at this time is calculated as follows (step S15).

$$C=sqrt((L0-Lc0)^2+(a0-ac0)^2+(b0-bc0)^2) \quad (5)$$

It is judged whether the amount of conversion C is greater than 10 which is a predetermined value (a distance in an L*a*b* space, which is not necessarily limited to this value and can be properly set by a person having an ordinary skill in the art and who uses this preferred embodiment) (step S16). If the amount of conversion C is 10 or less, it ids judged that the point is near to a color gamut boundary, and a point (Ld0, ad0, bd0) in an L*a*b* space is converted to the nearest point on the color gamut boundary on the condition that Ld0=L0, ad0=a0 and bd0=b0 using the closest neighborhood method described earlier in which problem 1 is likely to occur (step S19). If the amount of conversion C is greater than 10, the point is converted to a point closer by 10 (a distance in an L*a*b* space) than the conversion result of the chord clipping method. As described earlier, in the first preferred embodiment, if a point to be converted is located at a distance farther than the predetermined value from the color gamut boundary, a conversion is performed using the chord clipping method in such a way that the point to be converted is shifted to a point located at the distance of a predetermined value from the color gamut boundary, and then the closest neighborhood method is applied to it. At this time in processing, in step S14, the coordinate (Lc0, ac0, bc0) of a point at which the chord clipping straight line and the color gamut boundary are crossed, is already obtained using the chord clipping method. Therefore, a point (Ld0, ad0, bd0) located at the distance of the predetermined value (10 here) which is measured along the chord clipping conversion straight line from the color gamut boundary toward the point to be converted, is calculated as follows using both the coordinate value and the coordinated value (L0, a0, b0; L*a*b* value) of the point to be converted (step S18).

$$Ld0=Lc0+(L0-Lc0)\cdot 10/C$$

$$ad0=ac0+(a0-ac0)\cdot 10/C$$

$$bd0=bc0+(b0-bc0)\cdot 10/C \quad (6)$$

Then, the point is converted to the nearest point on the color gamut boundary using the closest neighborhood method based on the coordinate value (Ld0, ad0, bd0) in the L*a*b* space of the point obtained using equation (6). Then, the L* value, a* value and b* value of the nearest point are assigned to the variable L0, a0 and b0, respectively (step S19).

Then, in step S20, a CMY value corresponding to the L*a*b* value of the point of which the color gamut is converted or the point in the color gamut is calculated. This calculation method is obtained by using the interpolation calculation of expressions (1) to (4). When the CMY value is obtained, in step S21, its C value, M value and Y value are related to an L value (L), a value (a) and b value (b) which are currently being used in a process (the grid numbers of the L*a*b* value), and are registered in arrays C [L] [a] [b], M [L] [a] [b] and Y [L] [a] [b], respectively. In this way, if the arguments are assumed to be L, a and b, one piece of data of three three-dimensional arrays in which its C value, M value and Y value are stored, is generated. A color conversion table of which the arguments are L, a and b is composed of these three three-dimensional arrays.

Then, in step S22, b is incremented by one, and in step S23, if b≠17, the processes in steps S11 to S22 are repeated. When b=17, the flow proceeds to step S24. In step S24, b is initialized to b=0 and a is simultaneously incremented by one. In step S25, it is judged whether a=17, and if not, the processes in steps S11 to S24 are repeated. If in step S25 it holds true, the flow proceeds to step S26, a is initialized to a=0, and L is incremented by one. Then, it is judged whether L=17. If it does not hold true, the processes in steps S11 to S26 are repeated. If it holds true, the generation of a color conversion table is completed for all the grid points of 17×17×17 pieces in an L*a*b* space, and the process is terminated.

Although in the second preferred embodiment, the combination of the chord clipping method and the closest neighborhood method is adopted for a color gamut conversion method, the present invention is not limited to this method. For the closest neighborhood method, either a plane closest neighborhood method for limiting a color conversion to a color with the same hue as a grid point representing a color to be converted or a three-dimensional neighborhood method for calculating a conversion point three-dimensionally closest can also be adopted.

In the second preferred embodiment, first, a point to be converted is converted using the chord clipping method, and conversion in one stage and conversion in two stages are switched depending on whether the amount of conversion C (a distance in an L*a*b* space) is 10 or less. However, the switch method is not limited to this method. For example, the switch can also be performed based on a distance from a color gamut boundary (for example, 5 (distance in an L*a*b* space)). In this case, it can also be arranged in such a way that if the distance from the color gamut boundary (distance in an L*a*b* space) is 5 or less, the point is converted using the closest neighborhood method, and if the distance is more than 5, it is converted to a point distant by 5 (distance in the L*a*b* space) from the color gamut boundary toward the direction of the point to be converted using the chord clipping method, and then the point is converted using the closest neighborhood method.

Figure 8:
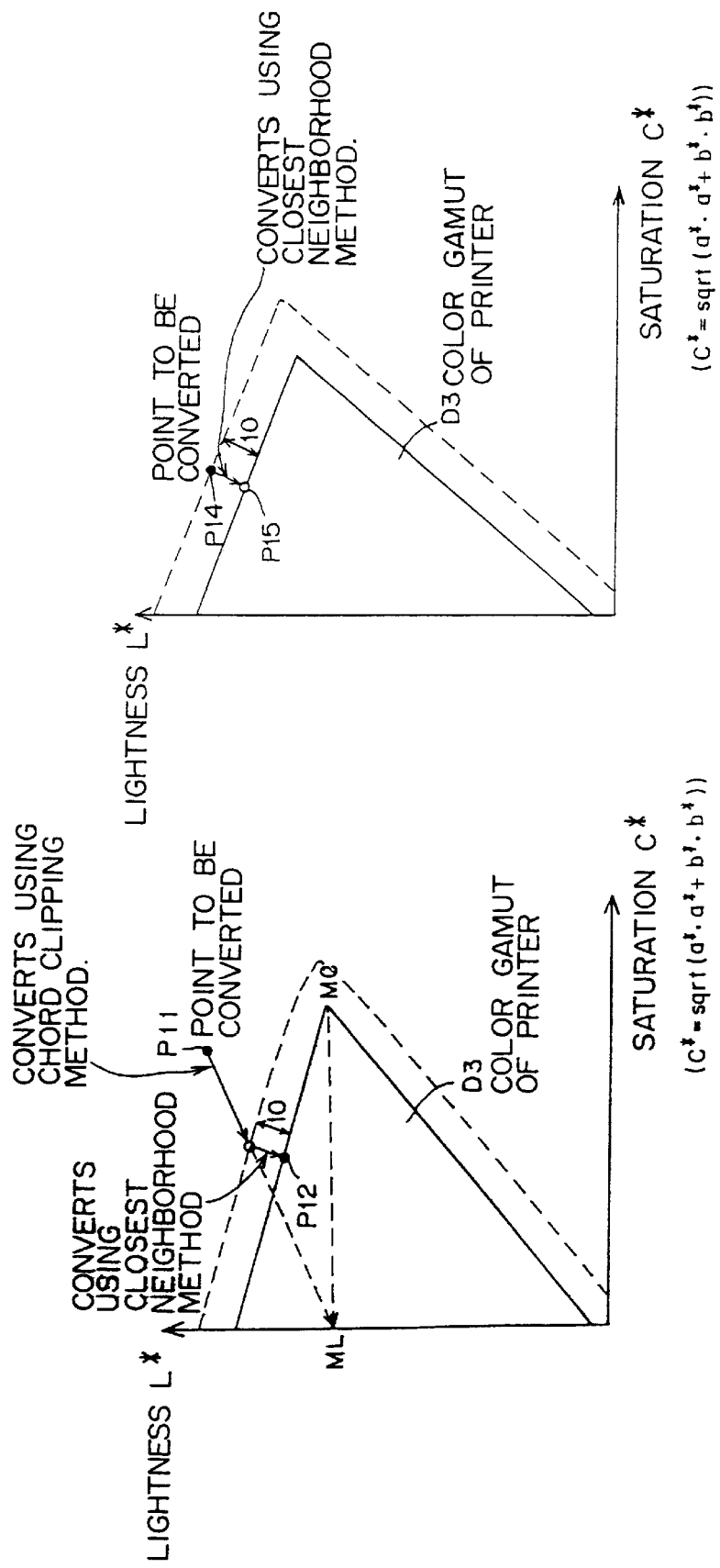

FIGS. 8A and 8B explain a color gamut conversion method, which is the third preferred embodiment of the present invention.

In the color gamut conversion method of the first preferred embodiment shown in FIGS. 6A and 6B, a point to be converted is shifted to the color gamut boundary of a printer using the chord clipping method, the distance to the color gamut boundary of the point to be converted is measured along a straight line connecting the point to be converted and a point ML of achromatic color with the same lightness as that of a point MC located inside the color gamut of the printer with the highest saturation on the same hue plane as the point to be converted (chord clipping conversion straight line), and whether the point is converted using both the chord clipping method and the closest neighborhood method or whether it is converted only using the closest neighborhood method is switched depending on whether the distance is greater than a predetermined distance.

As shown in FIGS. 8A and 8B, in the third preferred embodiment, the conversion method is switched by judging whether the measured distance of a point to be converted, in the direction of an outward normal for the border line of the color gamut D3 of a printer is longer than the predetermined value. Specifically, when the point to be converted is determined, the shortest distance between the point to be converted and the boundary of the color gamut D3 is calculated. The method used to calculate this shortest distance is the same as that described earlier. A circle or sphere of a predetermined radius with the point to be converted as the center is generated, and the radius of a circle or sphere which touches the boundary of the color gamut D3 is measured. It is judged whether this radius is greater than a predetermined value, for example, 10, and the conversion method is switched according to the judgment result. For example, if, as shown in FIG. 8A, the shortest distance between a point to be converted P11 and the boundary of the color gamut D3 is greater than "10", the point to be converted P11 is first converted using the chord clipping method in such a way that the point to be converted P11 is gradually shifted on the chord clipping conversion straight line connecting the point to be converted P11 and a point ML. Each time the point is shifted, the shortest distance between the shifted point and the boundary of the color gamut D3 is measured. When the shortest distance becomes 10, the conversion by the chord clipping method is stopped. Then, the point obtained by the final conversion of the chord clipping method is converted using the closest neighborhood method, and finally the point to be converted P11 is converted to a P12 on the boundary of the color gamut D3.

If, as shown in FIG. 8B, the shortest distance between a point to be converted P14 and the boundary of the color gamut D3 is shorter than the predetermined value (for example, 10), the point to be converted P14 is converted to a point P15 only by the closest neighborhood method, since there is a high possibility that the conversion is greatly affected by problem 1 if it is converted by the chord clipping method.

According to the third preferred embodiment, since when converting a point far from the color gamut, when the chord clipping method is applied first, the occurrence of problem 2 can be suppressed. Then, after the point is converted to a point near the color gamut boundary using the chord clipping method, the point obtained by conversion is converted using the closest neighborhood method, thereby Suppressing the occurrence of problem 1. If the point to be converted is located near the color gamut boundary, only the closest neighborhood method is applied, thereby suppressing the occurrence of problem 1. As a result, the occurrence of both problems 1 and 2 can be suppressed.

Figure 9:
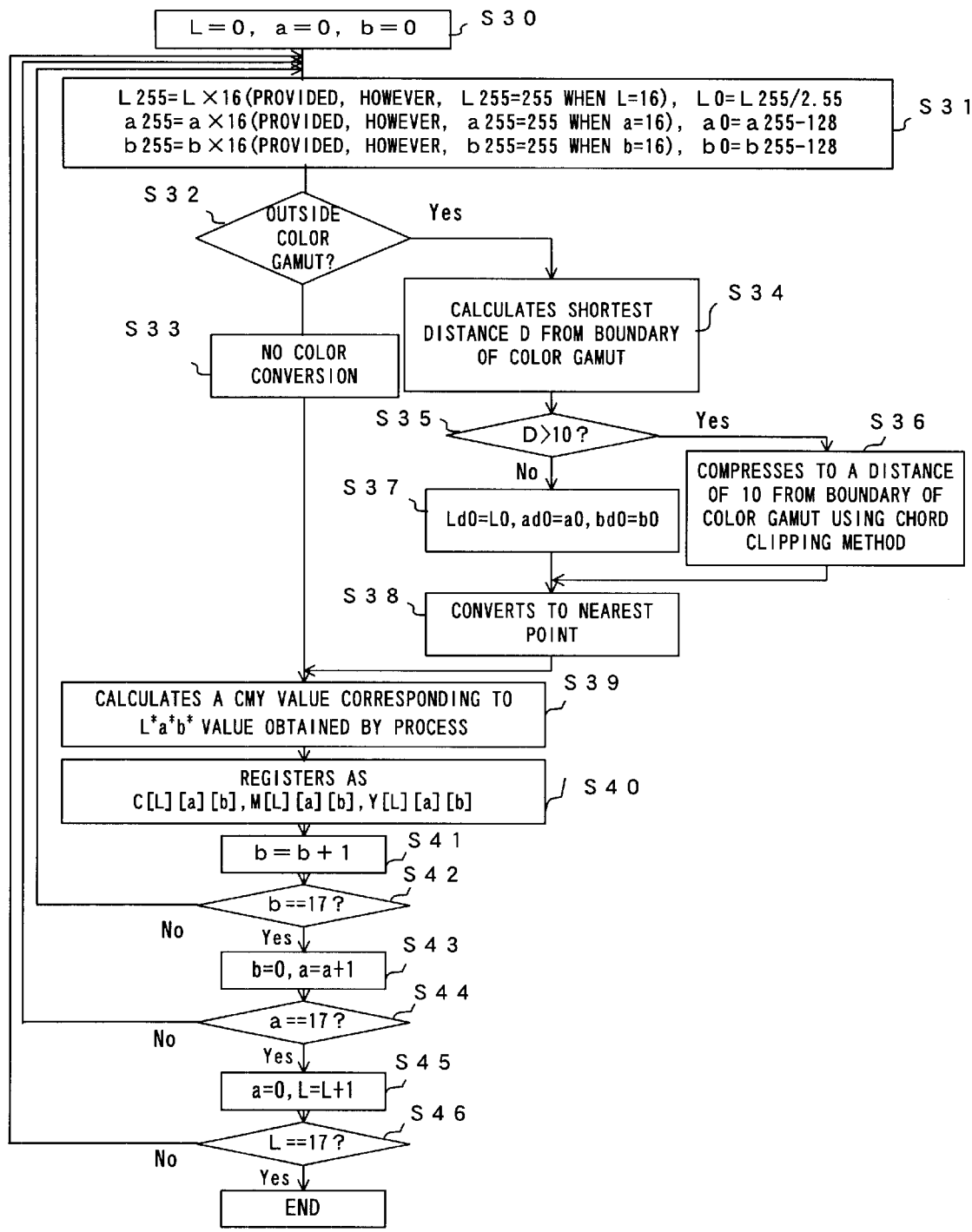
FIG. 9 is a flowchart showing how to generate a color conversion table in which the color gamut conversion method of the third preferred embodiment, shown in FIG. 2, which is the fourth preferred embodiment of the present invention, is applied.

FIG. 9 is a flowchart showing how to generate a color conversion table, which is the fourth preferred embodiment of the present invention, in which the color gamut conversion method of the third preferred embodiment is applied.

L, a and b, which are arguments (variables) for designating the numbers of a grid point, are all initialized to 0. In step S31, L255, a255 and b255, which are an L255* value, an a255* value and a b255* value, respectively, are obtained by multiplying L, a and b by "16", which is an interval between grid points. Furthermore, the L255* value, a255* value and b255* value are converted to an ordinary L* value, a* value and b* value (L0, a0, b0) in an L*a*b* space by dividing L255 by 2.55, subtracting 128 from a255, and subtracting 128 from b255, respectively.

Then, in step S32, it is judged whether a grid point (L0, a0, b0) to be converted, for example, is located outside the color gamut of a device, such as a printer of which the color conversion table is to be generated. If the point is located inside the color gamut, as shown in step S33, the flow proceeds to step S39 without color conversion. If in step S32, it is judged that the point (L0, a0, b0) to be converted is located outside the color gamut, as described earlier with reference to FIGS. 8A and 8B, in step S34, the shortest distance D between the grid point to be converted (hereinafter called the "point") and the color gamut boundary is calculated. When calculating the shortest distance D, first, a virtual point (hypothetical point) is generated at the distance of a predetermined value from the point to be converted in an L*a*b* space, and it is judged whether the hypothetical point is located inside the color gamut. This is judged according to the method described in the specification of the Japanese Patent Application No. 9-206741. Then, the hypothetical point is rotated about the point to be converted as the center. If the hypothetical point is not located inside the color gamut when rotated by 360 degrees, the distance between a position where the hypothetical point is generated and a point to be converted is slightly increased. The shortest distance D between the point and the color gamut boundary can be obtained by repeating such a process until the hypothetical point crosses the color gamut boundary. This operation is performed to obtain the radius of a circle or sphere which touches the color gamut boundary by changing the radius of the circle or sphere with the point to be converted as the center. Here, in order to obtain the shortest distance D on the same hue plane as the point to be converted, the hypothetical point is rotated by 360 degrees on the same hue plane with a proper angle as an initial value. In order to obtain the shortest distance D, in a three-dimensional space, between the point to be converted and the color gamut boundary, the hypothetical point is rotated with a position having a proper angle as an initial state in such a way that the solid angle of rotation is $4\pi$. Specifically, the same three-dimensional coordinate system as that used for setting the latitude and longitude of a globe is set with a proper direction set as an initial state, and the point to be converted is set as the origin of the three-dimensional coordinate system. Then, it is sufficient to rotate the hypothetical point on a spherical surface while changing two angles which regulate the direction of a three-dimensional vector with the point to be converted and the hypothetical point as a start point and an end point, respectively.

When the shortest distance D is determined in the way described above, in step S35 it is judged whether the shortest distance D is greater: than a predetermined value (10 here). If it is judged that the shortest distance D is greater than 10, in step S36 the point to be converted is shifted to a point distant by 10 from the color gamut boundary using the chord clipping method, since the point to be converted is far from the color gamut boundary. In this case, the point to be converted is not completely shifted at one time, but is gradually shifted by a proper interval on the chord clipping straight line. Each time it is shifted by one interval, the shortest distance D between the point to be converted and the color gamut boundary is measured in the same way as described for step S34, and the point to be converted is shifted until the shortest distance D becomes the predetermined value (10 here)(chord clipping compression). Then, the position of the point to be converted, in which the shortest distance D is 10, is stored as (Ld0, ad0, bd0). If in step S35, the shortest distance D is 10 or less, in step S37 the current position (L0, a0, b0) is stored as (Ld0, ad0, bd0).

In step S38, the closest neighborhood method is applied to a point specified by (Ld0, ad0, bd0) which is obtained above to perform a color gamut conversion. For the closest neighborhood method, either a plane closest neighborhood method or a three-dimensional closest neighborhood method can be used.

In step S39, a CMY value corresponding to a point specified by an L*a*b* value (Ld0, ad0, bd0) is calculated using the interpolation operations of equations (1) to (4), and in step S40, the CMY value is registered in arrays, C [L] [a] [b], M [L] [a] [b], Y [L] [a] [b].

In step S41, b is incremented by one, and in step S42, it is judged whether b=17, that is, whether grid points in the direction of a b* axis with the grid numbers of a certain L and a are all processed. If all the grid points have not been processed yet, the processes in steps S31 to S41 are repeated. If the judgment in step S42 is "Yes", in step S43 b is initialized to b=0, and a is incremented by one. Then, in step S44 it is judged whether a=17, that is, whether all grid points in the direction of an a* axis with the grid number of a certain L and all the grid numbers of b are processed. If all the grid points have not been processed yet, the processes in steps S31 to S43 are repeated. If the judgment in step S43 is "Yes", in step S45 a is initialized to a=0, and L is incremented by one. Then, in step S46, it is judged whether L=17. More specifically, it is judged whether all the grid points in the direction of an L* axis with all the grid numbers of a and b are processed. If all the grid points have not been processed yet, the processes in steps S31 to S45 are repeated. When the judgment in step S46 is "Yes", the process is terminated since a color conversion table which is required to convert an L*a*b* value to a CMY value has already generated for all the grid points needed for color gamut conversion in an L*a*b* space.

Figure 10:
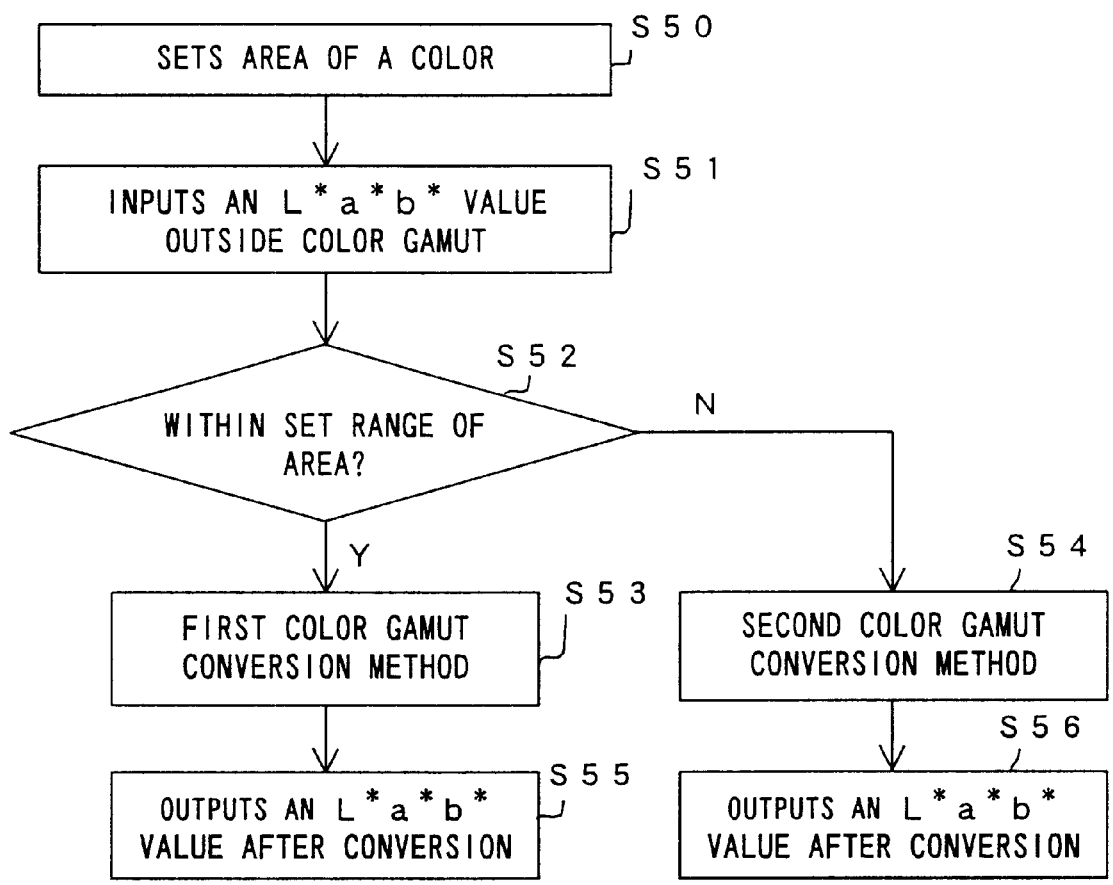
FIG. 10 is a simple flowchart showing the process of another preferred embodiment of the present invention.

FIG. 10 is a simple flowchart showing the process of another preferred embodiment of the present invention.

In a method shown in FIG. 10, a different color gamut conversion method is used depending on whether inputted color data are inside or outside a preset color area. For example, if a color gamut conversion method in which problem 1 is unlikely to occur, is applied to a color of a high saturation located near to the color gamut boundary, and if a color gamut conversion method in which problem 2 is unlikely to occur is applied to the other colors, the chance of problems 1 and 2, described earlier, ocurring can be reduced.

The color data conversion method of this preferred embodiment has a plurality of different color gamut conversion methods in order to place color data that is outside a target color gamut, inside the target color gamut, and a proper conversion method is selected depending on the area to which inputted color data belong. Accordingly, a proper color gamut conversion method such that neither problem 1 nor problem 2 is likely to occur, can be selected.

The choice of whether problem 1 or 2 should be suppressed can be made by selecting a proper conversion method, for example, by selecting a proper conversion method based on the relationship between the degree of features generated from the shape of the target color gamut (hereinafter called the "color gamut shape") and an inputted color data value. Here, the degree of features generated from a color gamut shape is the attribute value of a color gamut to be calculated based on the color gamut shape (for example, lightness (a L* value) of the highest saturation, etc.), and the selection of a proper conversion method based on its relationship with the inputted data value indicates to select it according to the relationship the inputted data value (for example, lightness) has with the degree of feature (for example, what the difference between the lightness of the highest saturation and the lightness of the inputted data value is).

In the flowchart shown in FIG. 10, in step S50 a color gamut to which a color gamut conversion method is switched is set. Then, in step S51, color data to be converted, in particular, the L*a*b* values of color data outside a target color gamut are inputted. The reason why color data outside the target color gamut are inputted is because there is no need to convert color data which are originally located inside the color gamut. In step S52, it is judged whether the L*a*b* value of the inputted color data are located inside the color gamut set above. If it is judged that it is located inside the color gamut, the color gamut of the inputted L*a*b* value is converted using a first color gamut conversion method (step S53). This first color conversion method is, for example, the closest neighborhood method. Then, an L*a*b* value after conversion is outputted (step S54). If it is judged that the L*a*b* value inputted in step S52 is not located inside the color gamut set above, in step S55 the color gamut of the L*a*b* value is converted using a second color gamut conversion method. Then, an L*a*b* value after conversion is outputted (step S56).

FIG. 11 explains a color gamut conversion method which is the fifth preferred embodiment of the present invention.

In this fifth preferred embodiment, a plurality of color gamut conversion methods are switched unlike the first and third preferred embodiments.

FIG. 11 shows a section obtained by cutting an L*a*b* space on a certain hue plane. Grid points representing colors to be registered in a color conversion table are distributed in the L*a*b* space. These grid points are distributed inside and outside the color gamut of a device, such as a printer, etc., for which the color conversion table is to be generated. For the L*a*b* values of grid points originally contained in the color gamut D4 of a printer, out of these grid points, corresponding CMY values are calculated as they are with no color gamut conversion. For the L*a*b* values of grid points located outside the color gamut D4 of the printer, a color compression is performed according to this preferred embodiment.

In this preferred embodiment, if a grid point to be converted is a grid point on a plane including a point MC of the same lightness as a point MC of the highest saturation inside the color gamut on a hue plane including the grid point, is nearest to a straight line connecting the point MC and a point ML of a chromatic color with the same lightness as the point MC on an L* axis, and is located outside the color gamut D4, the closest neighborhoods method is applied the grid point. The chord clipping method is applied to grid points, other than those above, outside the color gamut D4. In this way, out of grid points outside the color gamut D4, only grid points in the neighborhood of the boundary of the color gamut D4 of a printer, located near a plane representing the same lightness as the point MC of the highest saturation inside the color gamut D4 on the same hue plane as the grid point (these grid points also include grid points of higher saturation than the point MC of the highest saturation inside, the color gamut) are converted by the closest neighborhood method. Therefore, the occurrence of problem 1 is reduced and simultaneously the numbers of grid points in which problem 2 occurs can be reduced. Since grid points, other than the above, outside the color gamut D4 of the printer are converted using the chord clipping method, the occurrence of problem 2 in which a lot of grid points of higher saturation than the point MC are also converted to the same point MC (many different colors are converted to the same color), can be reduced.

Although in this preferred embodiment, the closest neighborhood method is selectively applied only to grid points nearest to a plane of the same lightness as the point MC including the straight line connecting the point MC of the highest saturation inside the color gamut D4 on the same hue plane, and located outside the color gamut D4, the condition for applying the closest neighborhood method is not limited to this, and an appropriate condition should be properly set by a person having an ordinary skill in the art. In particular, although it is described in this preferred embodiment that there is an interval of "16" between grid points, the closest neighborhood method can be applied to not only a grid point nearest to a plane of the same lightness as the point MC, but also the second nearest and the third nearest grid points if a color conversion table with an interval shorter than this is generated.

FIG. 12 is a flowchart showing how to generate a color conversion table, which is the sixth preferred embodiment of the present invention, in which the color gamut conversion method of the fifth embodiment is applied.

In the sixth preferred embodiment, like the preferred embodiments described earlier, for a process of generating data to be used, that is, for a process of obtaining a CMY value corresponding to an L*a*b* value distributed in a grid shape, based on the measured value of a patch outputted by a printer, the method described in the specification of the Japanese Patent Application No. 9-241491 is assumed to be used. For a method for judging whether or not a certain L*a*b* value is located inside a color gamut, the method described in the specification of the Japanese Patent Application No. 9-206741 is assumed to be used.

In this sixth preferred embodiment, like the second preferred embodiment, it is assumed 2.55 times an ordinary value is used for an L* value and an ordinary value plus 128 is used for a* and b* values (L255* value, a255* value, b255* value).

A color conversion table is a table in which colors after conversion (CMY values) corresponding to colors distributed in a grid shape with (L255* value, a255* value, b255* value) (17 values of 0, 16, 32, 48, 64, ..., 224, 240 and 255 in the following example) are stored.

The colors distributed in a grid shape are processed in order, and CMY values corresponding to the colors are calculated. The calculated C values, M values and Y values are stored in the three-dimensional arrays of C [L] [a] [b], M [L] [a] [b] and Y [L] [a] [b]. L, a and b are the numbers of the grid points on an L*axis, a* axis and b* axis, respectively. For example, the grid numbers corresponding to the minimum value (0, 0, 0) of (L255* value, a255* value, b255* value) are L=0, a=0, b=0, grid numbers corresponding to (16, 0, 0) are L=1, a=0, b=0, and grid numbers corresponding to (16, 128, 128) are L=1, a=8, b=8.

First, in step S60 variables L, a and b indicating the numbers of the grid point are all initialized to "0". Then, an L255* value, a255* value and b255* value are obtained from numbers L, a and b for specifying the position of the grid point. In this case, since an interval between grid points is "16", L255, a255 and b255 which, are an L255* value, a255* value and b255* value are obtained by multiplying L, a and b by 16, respectively. However, if the grid point numbers L, a and b are all "16", values corresponding to L255, a255 and b255 are all set to "255" (step S61). Then, in step S62 it is judged whether a grid point with the L255 value, a255 value and b255 value is located inside a color gamut. This is judged, for example, using the method described in the specification of the Japanese Patent Application No. 9-206741 described earlier. If a grid point to be processed (process target grid point) is located inside the color gamut, as shown in step S67, a color gamut conversion process is not executed, and the flow proceeds to step S68 to calculate the CMY value of a color corresponding to the grid point, that is, (L255 value, a255 value, b255 value).

If the process target grid point is outside the color gamut, a process of converting the color data represented by the grid point outside the color gamut, to color data contained inside the color gamut (color gamut conversion) is executed. In this case, first the shape of the color gamut in the hue of the inputted color data value (L255 value, a255 value, b255 value) is checked, and the lightness value ($L_{max}$) of the highest saturation inside the color gamut is calculated. The detailed calculating method of $L_{max}$ is described later. The highest saturation among the L255 values (lightness values) of all intervals from 0 to 255 is calculated in the color gamut of the hue of the inputted color data value, and the L255 value with the highest saturation is designated as $L_{max}$ (step S63).

Then, in step S64, it is judged whether for the lightness value of the process target grid point, $L_{max}-16 \leq L255 < L_{max}+16$. Specifically, it is judged whether the process target grid point is a point nearest to the lightness plane of $L_{max}$. If the judgment in step S64 is "Yes", that is, the process target grid point is the nearest point, the color data (L255, a255, b255) of the process target grid point is converted to the color data of a color gamut boundary nearest the grid point (step S66). If the judgment in step S64 is "No", that is, if it is not the nearest grid point, the process target grid point is converted using the chord clipping method (step S65).

Then, in step S68 a CMY value corresponding to the L*a*b* value obtained in step S65, S66 or S67, is calculated. The interpolation operation method described earlier is used for calculating this CNY value. In step S69, the CMY values obtained by the interpolation operation are registered in three-dimensional arrays C [L] [a] [b], M [L] [a] [b] and Y [L] [a] [b], and are designated as data for a color conversion table.

In step S70, b is incremented by one, and in step S71 it is judged whether b=17, that is, it is judged whether grid points in the direction of an L* axis with a specific L and a grid numbers are all processed. If the grid points have not all been processed yet, the processes in steps S61 to S70 are repeated. If all the grid points have already been processed, the flow proceeds to step S72. In step S72, b is initialized to b=0, and a is incremented by one. Then, in step S73, it is judged whether all the grid points in the direction of an a* axis with a specific L grid number and all b grid numbers are processed, that is, if a=17. If all the grid points have not been processed yet, the processes in steps S61 to S72 are repeated. If all the grid points have already been processed, the flow proceeds to step S74, a is initialized to a=0, L is incremented by one, and in step S75, it is judged whether all the grid points are in the direction of an L* axis, with all a and b grid numbers are processed, that is, if L=17. If all the grid points have not been processed yet, the processes in steps S61 to S74 are repeated. If L=17, the process is terminated since it means that all the grid points are processed.

FIG. 13 is a detailed flowchart showing the calculation process of L max in step S63 of the flowchart shown in FIG. 12.

First, in step S80 the distance from an L* axis on a plane parallel to an a*b* plane of an L*a*b* space, of a grid point focussed on when executing step S63 shown in FIG. 12 is calculated. This distance indicates the saturation of the grid point. Since a255 and b255 are values obtained by adding 128 to the a* value and b* value in the L*a*b* space, respectively, a255 and b255 must be restored to the a* value and b* value, in order to calculate the distance from the L* axis, that is, 128 must be subtracted from,the values of a255 and b255. The distance from an L* axis can be obtained using the following equation (7). Here, this distance (the saturation of a focussed grid point) is stored in variable "cref".

$$cref = \text{sqrt}((b255-128)\cdot(b255-128)+(a255-128)\cdot(a255-128)) \quad (7)$$

In step S81, variable Lref storing the value of an L* axis is initialized to "0". Then, a variable c for calculating the highest saturation of each value on the L* axis inside the color gamut of a hue to which the currently focussed grid point (L255, a255, b255) belongs is initialized to "0" (step S82).

In an L*a*b* space in a grid shape each hue plane is perpendicular to an a*b* plane and forms an angle θ with an a* axis parallel to the L* axis. Therefore, the following relation holds true between the angle θ of the hue to which the currently focussed grid point (L255, a255, b255) belongs and cref obtained using equation (7).

$$\cos \theta = (a255-128)/cref,$$

$$\sin \theta = (b255-128)/cref$$

Here, $a255-128=a^*$ and $b255-128=b^*$.

If the saturation of a grid point (L*, a*, b*) on a hue plane with an angle e is assumed to be c*, the following equation holds true.

$$a^* = c^* \cos \theta, \ b^* = c^* \sin \theta$$

Therefore, the shape of a color gamut on a certain hue plane can be obtained by checking whether (L*, a, b) is located inside the color gamut, while changing the values of a* and b* with c* as a parameter. The highest saturation of each value (0 to 255) of an L* value inside the color gamut is the saturation of a point at which an a* value and a b* value belonging to the color gamut become maximum values. Then, in step S83 the following equations (8) and (9) are calculated.

$$a255\text{tmp}=(a255-128)\cdot c/cref)+128 \quad (8)$$

$$b255\text{tmp}=(b255-128)\cdot c/cref)+128 \quad (9)$$

This equation indicates an operation to shift a hypothetical point on a straight line of the lightness of L255 on a hue plane to which the currently focussed grid point belongs, in a direction such that the a* value and b* value are increased by changing saturation c by one at a time from "0".

Equations (8) and (9) are expressed by equations (10) and (11), respectively.

$$a255\text{tmp}=c\cdot\cos \theta+128 \quad (10)$$

$$b255\text{tmp}=c\cdot\sin \theta+128 \quad (11)$$

As can be easily seen from equations (10) and (11), the values of a255tmp and b255tmp are increased in intervals of cos θ and sin θ, respectively, and simultaneously saturation c is also incremented by "1". Here, a255tmp and b255tmp are an a255* value and a b255* value, respectively, and in step S83, $a^*=c\cdot\cos \theta$ and $b^*=c\cdot\sin \theta$ are converted to an a255* value and a b255* value, respectively, in such a way that it can be judged whether a point with (Lref, a255tmp, b255tmp) is outside the color gamut, based on (Lref, a255tmp, b255tmp) which is an L255*a255*b255* value in step S84 described later in this preferred embodiment.

Then, in step S84, it is judged whether a hypothetical point specified by (Lref255, a255tmp, b255tmp) is outside the color gamut. If the hypothetical point is located inside the color gamut, the flow proceeds to step S85, c (saturation) is incremented by one, and the processes in steps S83 and S84 are repeated. As described above, increasing c indicates to gradually shift a hypothetical point away from an L* axis on a straight line having the value of Lref on a currently focussed hue plane, that is, to increase saturation.

If in step S84, it is judged that a hypothetical point specified by (Lref255, a255tmp, b255tmp) is outside the color gamut, in step S86, the value of saturation (c−1) is stored in an array cmaxtmp [Lref255] of which the argument is Lref255. The saturation (c−1) is the highest saturation in the case where the lightness in a color gamut on the currently focussed hue plane is Lref255. Then, in step S87, Lref255 is incremented by one (the L255* value of lightness is incremented by one), and in step S88, it is judged whether Lref=256. If the judgment in step S88 is "No", the processes in steps S82 to S87 are repeated, since this result means that the top of an L* axis, that is, a color of the highest lightness, is not scanned. If the judgement in step S88 is "Yes", the flow proceeds to step S89, since this result means that all the colors of from the lowest lightness to the highest lightness in the color gamut on the currently focussed hue plane are scanned. In step S89, a variable Lref255 indicating lightness is initialized to "0", and in step S90, both a variable cmax for storing the highest saturation and a variable Lmax for storing a lightness value to be calculated are initialized to "−1" and "0", respectively.

In step S91, it is judged whether cmaxtmp [Lref255] >cmax holds true. If the inequality holds true, in step S92, the lightness information about the highest saturation and a new point indicating the highest saturation are updated using cmax=cmaxtmp [Lref255] and Lmax=Lref255, and the flow proceeds to step S93. If in step S91, the inequality does not hold true, the flow proceeds to step S93. In step S93, Lref is incremented by one, and in step S94, it is judged whether Lref=256, that is, even the highest lightness is scanned. If the highest lightness is not scanned, the flow returns to step S91, and the processes in steps S91 to S93 are repeated. If in step S94, it is judged that Lref=256, the process is terminated since this result means that the highest saturation is also checked for all the lightness inside the color gamut on the currently focussed hue plane. At this time, since the lightness of a point of the highest saturation inside the color gamut on the currently focussed hue plane is stored in the variable Lmax, in step S64, shown in FIG. 8, the value of this variable Lmax can be used.

As described above, in the fifth and sixth preferred embodiments, color conversion by the closest neighborhood method in which problem 1 is unlikely to occur, is applied to color data of high saturation in which problem 1 is likely to occur. However, since a range in which color data can be converted using the closest neighborhood method, is narrow, a range in which problem 2 occurs is also narrow (see FIG. 11). In this way, the problems of the prior art can be greatly reduced.

Although in the fifth and sixth preferred embodiments, which is a combination of two conversion methods, the chord clipping method and the closest neighborhood method used for a color data conversion method, the color data conversion method is not limited to this method. As with the first through fifth preferred embodiments, a conversion method in which the amount of shift of color is small can be applied in a range where problem 1 is likely to occur. For example, only the simple nearest point (that is, a three-dimensional closest neighborhood method) cannot be adopted for a first color gamut conversion method, but the nearest point under the restricting condition for converting a grid point to be converted to a grid point of the same hue as the grid point to be converted (that is, a plane closest neighborhood method) can also be applied. In this case, although the amount of shift becomes somewhat larger than in the former case, the change in the appearance of color is small since there is no change in hue.

FIG. 14 is a simple flowchart showing the process of another preferred embodiment of the present invention.

In this preferred embodiment, not only are several methods switched, but also the final conversion result of color data is generated by composing the process results of color data obtained using a plurality of methods based on the degree of features which are generated from both the shape of a color gamut (for example, a lightness value with the broadest color gamut with the same hue as an inputted color data value, etc.) and the inputted color data value. For example, when a process result obtained using a color gamut conversion method in which problem 1 is unlikely to occur and a process result obtained using a color gamut conversion method in which problem 2 is unlikely to occur are composed and outputted, the likelihood of the problem described earlier occurring can be reduced if the higher its saturation near to a color gamut boundary is, the more a process result obtained using a color conversion method in which problem 1 is unlikely to occur is weighted and composed.

When composing, the composite ratio between the result obtained using a color gamut conversion method in which problem 1 is unlikely to occur and the result obtained using a color gamut conversion method in which problem 2 is unlikely to occur can also be changed based on the degree of features which are generated from both the shape of a color gamut (for example, a lightness value with the broadest color gamut among the same hue as an inputted color data value, etc.) and the inputted color data value (for example, a lightness value). In this way, the occurrence of problems 1 and 2 can be suppressed while continuously controlling the degree of color change compared with a case in which a different color gamut conversion method is selected according to an area to which the inputted color data belong.

Alternatively, as described above, a lightness value with the broadest color gamut with the same hue as the inputted data value can be used for the degree of features which are generated from the color gamut shape. The color gamut width of a lightness indicates expansion from the L* axis of a color gamut at the lightness value. Since problem 1 is likely to occur in the neighborhood of lightness with a broad color gamut, the extension of it can be used as an index for selection and composition.

For example, a method in which the amount of shift of color data is reduced depending on its process method can also be used for a color data conversion method in which problem 1 is unlikely to occur. Specifically, a method in which color data are converted using the closest neighborhood method (either three-dimensional or planar) can be used.

In the fifth and sixth preferred embodiments since two color gamut conversion methods with different properties are switched based on the relationship between the degree of features determined by a color gamut shape (lightness of the highest saturation of a color gamut among the same hue as an inputted color data) and an inputted color data value, the likelihood of occurrence of problems 1 and 2 can be easily reduced. However, as a result, color process results differ on both sides of a boundary. Colors originally located close to each other are often separated after a process. Therefore, in these preferred embodiments, in order to avoid the degradation of such a color balance, the two color gamut conversion methods are not simply switched, but are designed to be gradually switched in a certain area while being weighted.

The general flow of a color gamut conversion method of a grid point located outside a color gamut is described below.

In FIG. 14, in step S100, the L*a*b* value of a grid point representing a color to be converted is inputted. Then, in step S101, the L*a*b* value after conversion (a first value) is calculated by applying a first color gamut conversion method (for example, the closest neighborhood method) to the inputted L*a*b* value. In step S102, the L*a*b* value after conversion (a second value) is calculated by applying a second color gamut conversion method (for example, the chord clipping method) to the inputted L*a*b* value. In step S103, the degree of features to be converted which is generated based on the shape of a color gamut, that is, for example, a lightness value with the broadest color gamut with the same hue as the inputted L*a*b* value is referred to or calculated. Then, in step S104, the first and second values are composed based on the relationship between the referenced or calculated value of the degree of features and the inputted L*a*b* value, and the composition result is outputted as a final L*a*b* value.

FIG. 15 explains a color gamut conversion method which is the seventh preferred embodiment of the present invention.

FIG. 15 shows the section of an L*a*b* space which is cut on the same hue plane as a point (grid point) to be converted. In this preferred embodiment, a range of lightness Lmax±8 is designated as a range to be converted by the closest neighborhood method, with the lightness Lmax of a point MC of the highest saturation inside a color gamut D5 of a printer as a base. In the same way, a range of lightness Lmax+40 or more and a range of lightness Lmax−40 or less are designated as ranges to be converted by the chord clipping method, and ranges other than these are set as ranges in which the conversion result obtained using the two color gamut conversion methods are composed.

A summary of the composition method is given below and references FIG. 15. Here, the lightness of a point to be converted is assumed to be within a range of +8 to +40 with Lmax as a base. In this case, first the point to be converted is converted using the chord clipping method. A point to be converted and a point after conversion are denoted by black circles P21 and P22, respectively. Assuming that the point to be converted P21 is converted using the closest neighborhood method. Its point after conversion is indicated by a white circle P23. Then, the position in the range of +8 to +40 in which the lightness of the point to be converted P21 is located, is calculated. Assuming that distance from lightness Lmax+8 and a distance from lightness Lmax+40 of the lightness of the point to be converted P21 are b and a, respectively, a and b are calculated. Then, a point P24 which internally divides, into a ratio of a:b, a line connecting the point P22 obtained using the chord clipping method and the point P23 obtained using the closest neighborhood method is generated. If this internal dividing point is located on the color gamut boundary, it is outputted as a final conversion result. If it is not located on the boundary, the internal dividing point P24 is further converted to a point on the boundary using the closest neighborhood method, which is outputted as a generated point.

FIG. 16 is a flowchart showing how to generate a color conversion table in which the color gamut conversion method of the seventh embodiment which is the eighth preferred embodiment of the present invention is applied.

In this eighth preferred embodiment, similar to the seventh preferred embodiment described above, although the closest neighborhood method and the chord clipping method are applied to a point in a first range of Lmax−8≦lightness L255<Lmax+8 and a point in Lmax−40>lightness L255, and in a third range of lightness L255≦Lmax+40 outside the first range, respectively, for a point located in ranges other than the first, second and third ranges, a point to be converted is composed by interpolating the process results obtained using the two methods, and a final point to be converted is generated from the composed result. During interpolation, the farther from Lmax the point is located, the higher the contribution ratio (weight) of the process result of the chord clipping method, and the nearer to Lmax it is located, and the higher the contribution ratio (weight) of the process result of the closest neighborhood method.

Since the composition result obtained by interpolation is not always a point located on a color gamut boundary, a point (color data) on the color gamut boundary nearest to the composition result which is obtained by interpolation is designated as a conversion result. In this way, since, as shown in FIG. 15, the difference between the results of the two process methods is gradually filled up in a range where the process results of the two methods are composed, points obtained by conversion are also prevented from being discontinuously located on the color gamut boundary.

A flowchart shown in FIG. 16 is explained below.

In FIG. 16, step S110, variables L, a and b, to which numbers to be used to specify a point to be processed, are all initialized to "0". Then, in step S111, L255, a255 and b255, which are a L255* value, a255* value and b255* value, respectively, are obtained by multiplying L, a and b by "16" which is an interval between grid points. However, if L, a and b are all 16, it is assumed that L255=255, a255=255 and b255=255. Then, it is judged using the method described in the specification of the Japanese Patent Application No. 9-206741 whether a grid point currently under a process is outside a color gamut. If it is judged that it is located inside the color gamut, as shown in step S113, the flow proceeds to step S122 without color conversion. If in step S112, it is judged that the grid point currently to be processed (hereinafter called a "grid point to be processed") is outside the color gamut, in step S114, lightness Lmax of the highest saturation in the color gamut on a hue plane to which the grid point to be processed belongs is calculated. The calculation of Lmax is, for example, performed as described and with reference to FIG. 9.

Then, in step S115, it is judged whether Lmax−8±L255<Lmax+8 holds true. This determines whether the lightness of a grid point to be processed is located within a range which is processed using the closest neighborhood method. If the judgment result is "Yes", the flow proceeds to step S116, the closest neighborhood method is applied to the grid point to be processed, and the flow proceeds to step S122. If the judgment result in step S115 is "No", the flow proceeds to step S117, and it is judged whether the condition Lmax−40±L255 21 Lmax+40 holds true. If this judgment result is "No", in step S118, the chord clipping method is applied to the grid point to be processed since the lightness L255 of the grid point to be processed has a lightness of Lmax+40 or more, or of Lmax−40 or less. Then, after step S118, the flow proceeds to step S122.

If the judgment result in step S117 is "Yes", it is indicated that the lightness L255 of the grid point to be processed is located in either a range which is Lmax−40 or more and Lmax−8 or less, or a range which is Lmax+8 or more and Lmax+40 or less. These ranges are composed by interpolating the conversion results using the closest neighborhood method and the chord clipping method, respectively. Therefore, in step S119, both the chord clipping method and the closest neighborhood method are applied to the grid point to be processed, and the respective conversion result is calculated and stored. Then, in step S120, color data in which the respective conversion result of the chord clipping method and the closest neighborhood method is internally divided at a ratio of |L255−Lmax|−8:40−|L255−Lmax|. This corresponds to a case in which a and b are set in such a way that a=40−|L255−Lmax| and b=|L255−Lmax|−8 in FIG. 15, and corresponds to a process of obtaining a point where a line connecting a conversion point obtained using the chord clipping method and a conversion point obtained using the closest neighborhood method is internally divided at a ratio of a:b. Then, in step S121, a final conversion result is obtained by converting a point (color data) obtained by performing an interpolation process with the internal dividing ratio in step S120, to a point on a color gamut boundary nearest to the point using the closest neighborhood method, if necessary (if the point is converted to a point on a color gamut boundary by the internal division process, there is no need for conversion), and then the flow proceeds to step S122. Since as described earlier, a point (internal dividing point) obtained by the internal dividing point calculation process in step S120 is not always located on the color gamut boundary, this process in step S121 is executed only in a case where the internal dividing point is not located on the color gamut boundary. Thus, step S121 is further divided into two low-order processes: a step of judging whether the internal dividing point is located inside the color gamut and a step of converting the internal dividing point to a point on the color gamut boundary using the closest neighborhood method if the internal dividing point is not located on the color gamut boundary. If the internal dividing point is located on the color gamut boundary, the L*a*b* value of the internal dividing point is designated as the final result.

In step 122, a CMY value corresponding to the L*a*b* value obtained by the process in steps S113, S110, S118 or S121 is calculated. For this calculation method, the interpolation operation method of equations (1) to (4) are used. When the CMY value is obtained, in step S123, its C value, M value and Y value obtained above are registered in three-dimensional arrays C [L] [a] [b], M [L] [a] [b] and Y [L] [a] [b], respectively. In this way, the CMY value corresponding to one grid point is registered in a color conversion table consisting of three-dimensional arrays C [L] [a] [b], M [L] [a] [b] and Y [L] [a] [b].

In step S124, b is incremented by one, and in step S125, it is judged whether b=17, that is, whether grid points in the direction of a b* axis with a certain L number and a number are all processed. If it is judged that all the grid points have not been processed yet, the processes in steps S111 to S124 are repeated. When b=17, in step S126, b is initialized to b=0, a is incremented by one, and in step S127, it is judged whether a=17. More specifically, it is judged whether grid points in the direction of an a* axis with a certain L grid number and all b grid numbers have all been processed. If it is judged that the grid points have not been processed yet, the processes in steps S111 to S124 are repeated. When b=17, in step S126, b is initialized to b=0, a is incremented by one, and in step S127, it is judged whether a=17. Thus, grid points in the direction of an a* axis with a certain L grid number and all b grid numbers are all processed. If all the grid points have not been processed yet, the processes in steps S111 to S126 are repeated. If all the grid points have already been processed, in step S128, a is initialized to a=0, and L is incremented by one. Then, in step S129, it is judged whether L=17. More specifically, all grid points in the direction of an L* axis with all a and b grid numbers are processed. If not all the grid points have been processed yet, the processes in steps S111 to S128 are repeated. If L=17, the generation process of a color conversion table is terminated since it means that all the grid points have already been processed.

Although in the above description, an interval between grid points is 16 or 17, grid points are arranged in all the directions of an L* axis, a* axis and b* axis in an L*a*b* space, the arrangement is not limited to this, and intervals between grid points, etc., should be properly determined for the specific occasion.

FIG. 17 shows one embodiment of the color conversion apparatus for generating and outputting a color conversion table using "The generation method of a color conversion table" of all the preferred embodiments described above, which is the ninth preferred embodiment of the present invention.

When a certain L*a*b* value is inputted in a color gamut inside/outside judgment unit 11, a color conversion apparatus 10 judges whether a point represented by the L*a*b* value is located inside the color gamut of a picture output device (for example, a printer, display, etc.) using the color gamut inside/outside judgment unit 11. If the color gamut inside/outside judgment unit 11 judges that the point is located inside the color gamut, it outputs the inputted L*a*b* value to a color conversion table generation unit 14, since there is no need for conversion. The color conversion table generation unit 14 acquires a CMY value corresponding to the given L*a*b* value from data stored internally or externally which are obtained in advance, for example, using the method described in the specification of the Japanese Patent Application No. 9-241491, or calculates the CMY value using the method and registers it in a color conversion table. In particular, if the L*a*b* value does not require color conversion, a CMY value obtained using the method described in the patent application specification can also be stored in the color conversion table in advance. In this way, color conversion can be omitted.

If it is judged that a point in the L*a*b* space corresponding to an inputted L*a*b* value is outside the color gamut, the color gamut inside /outside judgment unit 11 outputs the L*a*b* value to a conversion unit 12. The conversion unit 12 determines the position in which the color gamut the L*a*b* value is located in the L*a*b* space, determines how to apply two color gamut conversion methods that have different properties, for example, the chord clipping method and the closest neighborhood method based on the judgment result, and performs the color gamut conversion of the inputted L*a*b* value based on the determination result. For example, the conversion unit 12 judges whether the inputted L*a*b* value is located within a predetermined distance from the color gamut boundary, as in the first preferred embodiment, or whether the lightness (L* value) of the inputted L*a*b* value is located in a predetermined vertical range of the lightness of the highest saturation inside the color gamut, as in the fifth preferred embodiment. Then, the conversion unit 12 performs color gamut conversion of the inputted L*a*b* value using either or both of the two color gamut conversion methods based on the judgment result, and outputs the conversion results to a selection/composition unit 13.

The selection/composition unit 13 selects either of the conversion results obtained using the two conversion methods based on the judgment result obtained in the conversion unit 12, or composes both of the conversion results obtained using the two conversion methods in the same way as in the seventh preferred embodiment. Then, the selection/composition unit 13 outputs the L*a*b* value after color gamut conversion obtained by selection or composition, to the color conversion table generation unit 14. The color conversion table generation unit 14 calculates a CMY value corresponding to the inputted L*a*b* value after color gamut conversion, and registers the CMY value in the color conversion table.

FIG. 18 shows a hardware environment needed to realize the method of the present invention by causing a computer to execute a program.

A program to realize the method of the present invention can be stored in a memory device 28, such as a hard disk drive, etc., or in a portable storage medium 27, and can be executed using a CPU 20. The CPU 20 exerts a basic input/output control over an input/output device, such as a communication interface 23, input/output device 25, storage medium read device 26 and memory device 28 by executing BOIS, etc. stored in a ROM 21 which is connected to the CPU 20 through a bus 30. If a program is stored in the memory device 28, the CPU 20 reads the program stored in the portable storage medium from the memory device 28 via a bus 30, develops it so that it can be executed in a RAM 22, and executes it. If the program is stored in the portable storage medium 27, the CPU 20 controls the storage medium read device 26 through a bus 30, extracts the program from the storage medium read device 26, develops it so that it can be executed in a RAM 22, and executes it. Even if the program is held by an information provider 24 connected through a network 29, such as the Internet, etc., the CPU 20 downloads the program held by the information provider 24 to the memory device 28, etc., through the network 29 by controlling the communication interface 23 through a bus 30, and executes it. If this hardware is connected with the information provider 24 over a network 29, such as a LAN, MAN, WAN, etc., through the communication interface 23, the CPU 20 remotely executes the program held by the information provider 24, downloads only a color conversion table which is the execution result from the information provider 24 through the network 29, and stores and registers it in the memory device 28 or the portable storage medium 27. The input/output device 25, which is connected to the CPU 20 through a bus 30 includes a display, keyboard, mouse, etc., and is used to input commands or data needed by a user to execute the program and to confirm the process results, such as the contents of the color conversion table obtained by execution, etc., on a display. An I/O interface 40 is connected to the CPU 20 through a bus 30, and controls, for example, a printer (not shown in figure) or a calorimeter (not shown in figure), causes a printer to print a color slip (patch printing), causes the colorimeter to measure the color of the printed color slip, and transmits the measurement result to the CPU 20.

If the hardware environment as shown in FIG. 18 is realized as a device normally provided with a color conversion table generation function according to the present invention, a program to realize the function can also be stored in advance in the ROM 21.

FIG. 19 explains the general use form of a color conversion table generated by the color gamut conversion table generation method according to the present invention.

For example, if a picture on a display is printed by a personal computer (PC) 31, a color picture output device 32 (typically a printer) is connected to the personal computer 31, a printer driver 33 installed in the personal computer 31 is activated, and the picture is outputted and printed on the color picture output device 32. The printer driver 33 can generally be generated as a program file, stored in the portable storage medium 36 and be distributed, and distributed by the information provider 37 through a communication network, such as the Internet, an intranet, an extranet, etc. If in this case, the portable storage medium 36 is used to store the printer driver 33, the printer driver 33 can be read from the portable storage medium 36 by the storage medium read device 38, installed in the personal computer 31, and. executed. The printer driver 33 supplied by the information provider 37 can also be downloaded through the network 39 by controlling the communication interface 35, installed in the personal computer 31, and executed.

The printer driver 33 includes a color: conversion table 34 which can be generated using the method according to the present invention, and refers to the color conversion table 34 when generating color data to be outputted to the color picture output device 32 from color data on its display. The color conversion table 34 can store the color data in the portable storage medium 36 as a data file or as a part of a program file similar to the printer driver 33, and can distribute them by being downloaded from the information provider 37 through a communication network, such as the Internet, etc. In this case, the color conversion table 34 can be read from the portable storage medium 36 by the storage medium read device 38, and installed in the printer driver 33. Alternatively, the information provider 37 can be accessed through the communication interface 35, only the color conversion table 34 can be down-loaded from the information provider 37 through the network 39 and the communication interface 35, and the color conversion table 34 can be used by installing it in the printer driver 33.

Although in the preferred embodiments, an L*a*b* space is used for a uniform color space, an L*u*v*: space, etc., can also be used.

As described above and in the present invention, in order to cope with both problem 1, in which the saturation of even colors inside a color gamut is greatly reduced when performing a color conversion, and problem 2, in which the balance between colors is greatly reduced since colors that are different before conversion become the same color after conversion, of the conventional color gamut conversion method, two color processing methods, in each of which only one of problems 1 and 2 is unlikely to occur, are designed to be switched or composed according to the existing area in a uniform color space of the inputted color data. Accordingly, the likelihood of both problems 1 and 2 occurring can be simultaneously reduced.

What is claimed is:

1. A color data conversion method for converting color data to color data inside a target color gamut, comprising the steps of:

(a) judging whether color data to be converted is contained in a predetermined area of the target color gamut; and (b) converting the color data to be converted using one of at least two color gamut conversion methods or combining two or more color gamut conversion methods according to a judgment result in said step (a) and outputting its result.

2. The color data conversion method according to claim 1, wherein said at least two color gamut conversion methods consist of a first color gamut conversion method and a second color gamut conversion method, the predetermined area is in a neighborhood of the target area located within a predetermined distance from the target color gamut, and said step (b) comprises the steps of:
   (c) converting a color data value located outside the predetermined area in two stages of the first color gamut conversion method and the second color gamut conversion method and outputting its result; and
   (d) converting a color data value inside the predetermined area using the first color gamut conversion method and outputting its result.

3. The color data conversion method according to claim 2, wherein said step (c) comprises the steps of:

(c1) converting color data located outside the predetermined area to that inside the predetermined area using the first color gamut conversion method; and (c2) converting a conversion result of said step (c1) to color data inside the target color gamut using the second color gamut conversion method.

4. The color data conversion method according to claim 1, wherein said step (b) comprises the steps of:

(e) converting color data to be converted to that inside the target color gamut using the first color gamut conversion method;

(f) calculating intermediate color data between a color data to be converted and the color data obtained in said step (e); and (g) converting the intermediate color data to color data inside the target color gamut using the second color gamut conversion method.

5. The color data conversion method according to claim 1, further comprising the steps of:

(h) selecting one of at least two color gamut conversion methods as a method for converting the color data to be converted; and (i) selecting one of at least two pieces of color data which are conversion results obtained for at least two color gamut conversion methods as color data which are conversion results.

6. The color data conversion method according to claim 5, further comprising the step of:

(j) said steps (h) and (i) comparing the degree of features of a color gamut shape generated from a shape of the target color gamut and an inputted color data value and performing the selection based on its comparison result.

7. The color data conversion method according to claim 1, further comprising the step of:

(k) referring to both of the degree of features of the color gamut shape generated from the target color gamut shape and the color data value to be converted, and generating new color data from a plurality of color data which are conversion results of at least two color gamut conversion methods.

8. The color data conversion method according to claim 1, wherein the degree of features of the color gamut shape generated from the target gamut shape is a lightness value of a point of a highest saturation on a same hue plane as the color data value to be converted.

9. A color conversion table for converting colors exhibited by a first device to colors which can be exhibited by a second device, wherein color data values which are registered in the color conversion table are generated using a color data conversion method comprising the steps of (a) judging whether color data to be converted are contained in a predetermined area of a color gamut of the second device and (b) converting the color data to be converted using one of at least two color gamut conversion methods or combining two or more color conversion methods and outputting a result, and registering color data values of the second device corresponding to the color data values.

10. A device driver of a second device for outputting colors exhibited by a first device as colors which can be exhibited by the second device, comprising a color conversion table in which color data values generated using a color data conversion method comprising the steps of (a) judging whether color data to be converted are contained in a predetermined area of a color gamut of the second device and (b) converting the color data to be converted using one of at least two color gamut conversion methods or combining two or more color conversion methods and outputting a result, and registering color data values of the second device corresponding to the color data values.

11. A color data conversion apparatus for converting color data to color data inside a target color gamut, comprising:
   judging means for judging whether color data to be converted are contained in a predetermined area of the target color gamut; and
   converting means for converting the color data to be converted using one of at least two color gamut conversion methods or combining two or more color gamut conversion methods and outputting a result.

12. The color data conversion apparatus according to claim 11, wherein the at least two color gamut conversion methods consist of a first color gamut conversion method and a second color gamut conversion method,
   the predetermined area is in a neighborhood of the target area located within a predetermined distance from the target color gamut, and
   said converting means comprises:
      selecting and converting means for converting a color data value outside the predetermined area in two stages of the first color gamut conversion method and the second color gamut conversion and outputting its result, and converting a color data value inside the predetermined area using the first color gamut conversion method and outputting a result.

13. The color data conversion apparatus according to claim 12, wherein said selecting and converting means converts the color data outside the predetermined area to that inside the predetermined area using the first color gamut conversion method and further converts the conversion result to color data inside the target color gamut using the second color gamut conversion method.

14. The color data conversion apparatus according to claim 11, wherein said converting means converts color data to be converted to that inside the target color gamut using the first color gamut conversion method, calculates intermediate color data located between color data obtained by the conversion and color data inside the target color gamut, and converts the intermediate color data to color data inside the target color gamut using the second color gamut conversion method.

15. The color data conversion apparatus according to claim 11, wherein said converting means selects one from at least two color gamut conversion methods for converting the color data to be converted, and selects one from at least two pieces of color data which are conversion results obtained using at least two color gamut conversion methods as color data which are conversion results.

16. The color data conversion apparatus according to claim 15, wherein said converting means compares the degree of features of a color gamut shape generated from the target color gamut shape and an inputted color data value, and performs the selection based on its comparison result.

17. The color data conversion apparatus according to claim 11, wherein said converting means refers to both of the degree of features of a color gamut shape generated from the target color gamut shape, and generates new color data from a plurality of color data which are conversion results of at least two color gamut conversion methods.

18. The color data conversion apparatus according to claim 16 or 17, wherein the degree of features of the color gamut shape generated from the target color gamut shape is a lightness value of a point of a highest saturation on a same hue plane as the color data value to be converted.

19. A computer-readable storage medium on which is recorded a program for causing a computer to execute a process, said process comprising the steps of:
   (a) judging whether color data to be converted are contained in a predetermined area of a target color gamut; and
   (b) converting the color data to be converted using one of at least two color gamut conversion methods or combining two or more color gamut conversion methods and outputting a result.

20. The storage medium on which is recorded a program for causing a computer to execute a process according to claim 19, wherein at least two color gamut conversion methods consist of a first color gamut conversion method and a second color gamut conversion method,
   the predetermined area is in a neighborhood of the target area located within a predetermined distance from the target color gamut, and
   said step (b) comprises the steps of:
      (c) converting a color data value located outside the predetermined area in two stages of the first color gamut conversion method and the second color gamut conversion method and outputting its result; and
      (d) converting a color data value inside the predetermined area using the first color gamut conversion method and outputting a result.

21. The storage medium on which is recorded a program for causing a computer to execute a process according to claim 20, wherein said step (c) comprises the steps of:
   (c1) converting color data located outside the predetermined area to that inside the predetermined area using the first color gamut conversion method; and
   (c2) converting a conversion result of said step (c1) to color data inside the target color gamut using the second color gamut conversion method.

22. The storage medium on which is recorded a program for causing a computer to execute a process according to claim 19, wherein said step (b) comprises the steps of:
   (e) converting color data to be converted to that inside the target color gamut using the first color gamut conversion method;
   (f) calculating intermediate color data between color data to be converted and color data obtained in said step (e); and (g) converting the intermediate color data to color data inside the target color gamut using the second color gamut conversion method.

23. The storage medium on which is recorded a program for causing a computer to execute a process according to claim 19, further comprising the steps of:
   (h) selecting one from at least two color gamut conversion methods as a method for converting the color data to be converted; and
   (i) selecting one from at least two color data which are conversion results obtained from at least two color gamut conversion methods as color data which are conversion results.

24. The storage medium on which is recorded a program for causing a computer to execute a process according to claim 23, further comprising the step of:
   (j) said steps (h) and (i) comparing the degree of features of a color gamut shape generated from a shape of the target color gamut and an inputted color data value and performing the selection based on its comparison result.

25. The storage medium on which is recorded a program for causing a computer to execute a process according to claim 19, further comprising the step of:
   (k) referring to both of the degree of features of the color gamut shape generated from the target color gamut shape of the color data value to be converted and generating new color data from a plurality of color data which are conversion results of at least two color gamut conversion methods.

* * * * *